United States Patent
Watfa et al.

(10) Patent No.: US 11,716,661 B2
(45) Date of Patent: *Aug. 1, 2023

(54) METHODS AND APPARATUS FOR SELECTION OF DEDICATED CORE NETWORK

(71) Applicant: InterDigital Patent Holdings, Inc., Wilmington, DE (US)

(72) Inventors: Mahmoud Watfa, Saint Leonard (CA); Guanzhou Wang, Brossard (CA); Behrouz Aghili, Commack, NY (US); Amir Helmy, Vancouver (CA)

(73) Assignee: InterDigital Patent Holdings, Inc., Wilmington, DE (US)

(*) Notice: Subject to any disclaimer, the term of this patent is extended or adjusted under 35 U.S.C. 154(b) by 0 days.

This patent is subject to a terminal disclaimer.

(21) Appl. No.: 17/577,591

(22) Filed: Jan. 18, 2022

(65) Prior Publication Data

US 2022/0141743 A1    May 5, 2022

Related U.S. Application Data

(63) Continuation of application No. 17/002,246, filed on Aug. 25, 2020, now Pat. No. 11,228,956, which is a
(Continued)

(51) Int. Cl.
*H04W 36/12*    (2009.01)
*H04W 36/00*    (2009.01)
*H04W 36/22*    (2009.01)

(52) U.S. Cl.
CPC ....... *H04W 36/12* (2013.01); *H04W 36/0055* (2013.01); *H04W 36/22* (2013.01)

(58) Field of Classification Search
None
See application file for complete search history.

(56) References Cited

U.S. PATENT DOCUMENTS

| | | | |
|---|---|---|---|
| 6,567,667 B1 | 5/2003 | Gupta et al. | |
| 7,305,251 B2 | 12/2007 | Kuchibhotla et al. | |

(Continued)

FOREIGN PATENT DOCUMENTS

| | | |
|---|---|---|
| CN | 1878102 | 12/2006 |
| CN | 101047960 | 10/2007 |

(Continued)

OTHER PUBLICATIONS

Ericsson, "Inter-eNodeB Handover with CN Node Relocation," 3GPP TSG SA WG2 Meeting #60b—SAE drafting ad-hoc, TD S2-074384, Warsaw, Poland (Nov. 7-9, 2007).
(Continued)

*Primary Examiner* — Otis L Thompson, Jr.
(74) *Attorney, Agent, or Firm* — Volpe Koenig

(57) ABSTRACT

Methods and apparatuses for redirecting a wireless transmit/receive unit (WTRU) to a dedicated core network (CN) node are described. An apparatus is configured to initiate a Service Request with a non-dedicated network node. The apparatus is configured to receive a special identifier in response to the Service Request, which indicates the apparatus should be redirected to a dedicated CN node based on subscription information. Radio access network resources associated with the apparatus may be released and the apparatus may then perform a tracking area update (TAU) request which is then forwarded to the dedicated CN node.

20 Claims, 14 Drawing Sheets

Related U.S. Application Data continuation of application No. 16/385,529, filed on Apr. 16, 2019, now Pat. No. 10,757,626, which is a continuation of application No. 15/959,701, filed on Apr. 23, 2018, now Pat. No. 10,264,498, which is a continuation of application No. 15/309,574, filed as application No. PCT/US2015/029999 on May 8, 2015, now Pat. No. 9,955,393.

(60) Provisional application No. 62/017,628, filed on Jun. 26, 2014, provisional application No. 62/014,356, filed on Jun. 19, 2014, provisional application No. 61/990,543, filed on May 8, 2014.

(56) References Cited

U.S. PATENT DOCUMENTS

| | | | |
|---|---|---|---|
| 8,504,055 | B2 | 8/2013 | Vikberg et al. |
| 9,264,945 | B2 | 2/2016 | Ramachandran et al. |
| 9,271,198 | B2 | 2/2016 | Pehrsson et al. |
| 9,572,134 | B2 | 2/2017 | Zembutsu et al. |
| 10,111,145 | B2 * | 10/2018 | Bangolae .......... H04W 52/0203 |
| 10,405,227 | B2 | 9/2019 | Jeong et al. |
| 2007/0213060 | A1 | 9/2007 | Shaheen |
| 2010/0120399 | A1 | 5/2010 | Guo et al. |
| 2010/0220662 | A1 | 9/2010 | Di et al. |
| 2011/0142239 | A1 | 6/2011 | Suh et al. |
| 2011/0188455 | A1 | 8/2011 | Suzuki et al. |
| 2011/0195737 | A1 | 8/2011 | Kanazawa et al. |
| 2011/0223887 | A1 | 9/2011 | Rune et al. |
| 2011/0280217 | A1 | 11/2011 | Drevon et al. |
| 2012/0033659 | A1 | 2/2012 | Zhang et al. |
| 2012/0287854 | A1 | 11/2012 | Xie et al. |
| 2012/0302230 | A1 | 11/2012 | Lim et al. |
| 2013/0044709 | A1 | 2/2013 | Adjakple et al. |
| 2013/0095834 | A1 | 4/2013 | Hou et al. |
| 2014/0036776 | A1 * | 2/2014 | Al-Shalash ....... H04W 36/0033 370/328 |
| 2014/0057566 | A1 | 2/2014 | Watfa et al. |
| 2014/0078890 | A1 | 3/2014 | Lu et al. |
| 2015/0098321 | A1 | 4/2015 | Jeong et al. |
| 2015/0118993 | A1 | 4/2015 | Rune et al. |
| 2015/0264741 | A1 | 9/2015 | Jheng et al. |
| 2015/0282011 | A1 | 10/2015 | Watfa |
| 2015/0282048 | A1 * | 10/2015 | Zhang .................. H04W 48/18 455/432.3 |
| 2015/0282145 | A1 | 10/2015 | Kim et al. |
| 2016/0029278 | A1 | 1/2016 | Poikonen et al. |
| 2016/0037417 | A1 | 2/2016 | Xing et al. |
| 2016/0050601 | A1 | 2/2016 | Jeong et al. |
| 2016/0066231 | A1 * | 3/2016 | Zembutsu ............... H04M 3/42 370/331 |
| 2016/0080979 | A1 | 3/2016 | Jin et al. |
| 2016/0227457 | A1 | 8/2016 | Tanaka et al. |
| 2016/0262068 | A1 | 9/2016 | Won et al. |
| 2019/0075517 | A1 | 3/2019 | Martin et al. |
| 2019/0159088 | A1 | 5/2019 | Shi et al. |
| 2019/0230621 | A1 | 7/2019 | Dai et al. |
| 2019/0261261 | A1 | 8/2019 | Ishii |
| 2019/0261264 | A1 | 8/2019 | Lou et al. |

FOREIGN PATENT DOCUMENTS

| | | |
|---|---|---|
| CN | 101052209 | 10/2007 |
| CN | 101272618 | 9/2008 |
| CN | 101521871 | 9/2009 |
| CN | 102170626 | 8/2011 |
| WO | 10/080056 | 7/2010 |

OTHER PUBLICATIONS

Ericsson, "P-CR on Re-routing before NAS security setup," SA WG2 Meeting #103, S2-141676, Phoenix, Arizona, USA (May 19-23, 2014).

Huawei et al., "Approach for support of dedicated CNs," SA WG2 Meeting #103, S2-141897, Phoenix, Arizona, USA (May 19-23, 2014).

Huawei et al., "Considerations on support of dedicated CNs," SA WG2 Meeting #100, S2-134202, San Francisco, USA (Nov. 11-15, 2013).

Huawei et al., "HSS-initiated Dedicated CN Node Reselection," SA WG2 Meeting #105, S2-143218, Sapporo, Japan (Oct. 13-17, 2014).

Huawei et al., "Update of null-NRI/null-MMEGI based redirection during Attach," SA WG2 Meeting #105, S2-143685, Sapporo, Japan (Oct. 13-17, 2014).

Interdigital Communications, "Redirection to a Dedicated Network during a TAU with PGW Change," SA WG2 Meeting #104, S2-142564, Dublin, Ireland (Jul. 7-11, 2014).

Interdigital Communications, "Redirection to a Dedicated Network during a Service Request Procedure," SA WG2 Meeting #104, S2-142563, Dublin, Ireland (Jul. 7-11, 2014).

NEC, "Definitions for Décor," SA WG2 Meeting #103, S2-141925, Phoenix, Arizona, USA (May 19-23, 2014).

NSN, "MME triggered S1 handover," SA WG2 Meeting #100, S2-134179, San Francisco, USA (Nov. 11-15, 2013).

NTT Docomo et al., "Discussion on Core Network Type Selection based on the Subscription Information," TSG SA WG2 #100, S2-134328, San Francisco, USA (Nov. 11-15, 2013).

NTT Docomo et al., "Introduce the Dedicated Core Network (DECOR) feature," SA WG2 Meeting #108, S2-151399, San Jose Del Cabo, Mexico (Apr. 13-17, 2015).

NTT Docomo et al., "New WID on Dedicated Core Networks," 3GPP TSG|WG-2 Meeting #102, S2-141501, St. Julien's, Malta (Mar. 24-28, 2013).

NTT Docomo, "P-CR on Solution 1: Redirection Solution," SAWG2 Meeting#103, S2-141710, Phoenix, Arizona, USA (May 19-23, 2014).

Third Generation Partnership Project, "Technical Specification Group Radio Access Network; Evolved Universal Terrestrial Radio Access Network (E-UTRAN); S1 Application Protocol (S1AP) (Release 8)," 3GPP TS 36.413 V8.10.0 (Jun. 2010).

Third Generation Partnership Project, "Technical Specification Group Radio Access Network; Evolved Universal Terrestrial Radio Access Network (E-UTRAN); S1 Application Protocol (S1AP) (Release 9)," 3GPP TS 36.413 V9.8.0 (Dec. 2011).

Third Generation Partnership Project, "Technical Specification Group Radio Access Network; Evolved Universal Terrestrial Radio Access Network (E-UTRAN); S1 Application Protocol (S1AP) (Release 11)," 3GPP TS 36.413 V11.8.0 (Sep. 2014).

Third Generation Partnership Project, "Technical Specification Group Radio Access Network Evolved Universal Terrestrial Radio Access Network (E-UTRAN); S1 Application Protocol (S1AP) (Release 12)," 3GPP TS 36.413 V12.1.0 (Mar. 2014).

Third Generation Partnership Project, "Technical Specification Group Radio Access Network; Evolved Universal Terrestrial Radio Access Network (E-UTRAN); S1 Application Protocol (S1AP) (Release 9)," 3GPP TS 36.413 V9.10.0 (Sep. 2014).

Third Generation Partnership Project, "Technical Specification Group Radio Access Network; Evolved Universal Terrestrial Radio Access Network (E-UTRAN); S1 Application Protocol (S1AP) (Release 10)," 3GPP TS 36.413 V10.7.0 (Dec. 2013).

Third Generation Partnership Project, "Technical Specification Group Radio Access Network; Evolved Universal Terrestrial Radio Access Network (E-UTRAN); S1 Application Protocol (S1AP) (Release 10)," 3GPP TS 36.413 V10.9.0 (Sep. 2014).

Third Generation Partnership Project, "Technical Specification Group Radio Access Network Evolved Universal Terrestrial Radio Access Network (E-UTRAN); S1 Application Protocol (S1AP) (Release 11)," 3GPP TS 36.413 V11.6.0 (Dec. 2013).

Third Generation Partnership Project, "Technical Specification Group Radio Access Network Evolved Universal Terrestrial Radio Access Network (E-UTRAN); S1 Application Protocol (S1AP) (Release 12)," 3GPP TS 36.413 V12.5.0 (Mar. 2015).

Third Generation Partnership Project, "Technical Specification Group Services and System Aspects; General Packet Radio Service (GPRS)

(56) References Cited

OTHER PUBLICATIONS enhancements for Evolved Universal Terrestrial Radio Access Network (E-UTRAN) access (Release 8)," 3GPP TS 23.401 V8.18.0 (Mar. 2013).
Third Generation Partnership Project, "Technical Specification Group Services and System Aspects; General Packet Radio Service (GPRS) enhancements for Evolved Universal Terrestrial Radio Access Network (E-UTRAN) access (Release 10)," 3GPP TS 23.401 V10.13.0 (Dec. 2014).
Third Generation Partnership Project, "Technical Specification Group Services and System Aspects; General Packet Radio Service (GPRS) enhancements for Evolved Universal Terrestrial Radio Access Network (E-UTRAN) access (Release 13)," 3GPP TS 23.401 V13.2.0 (Mar. 2015).
Third Generation Partnership Project, "Technical Specification Group Services and System Aspects; General Packet Radio Service (GPRS) enhancements for Evolved Universal Terrestrial Radio Access Network (E-UTRAN) access (Release 9)," 3GPP TS 23.401 V9.15.0 (Mar. 2013).
Third Generation Partnership Project, "Technical Specification Group Services and System Aspects; General Packet Radio Service (GPRS) enhancements for Evolved Universal Terrestrial Radio Access Network (E-UTRAN) access (Release 9)," 3GPP TS 23.401 V9.16.0 (Dec. 2014).
Third Generation Partnership Project, "Technical Specification Group Services and System Aspects; General Packet Radio Service (GPRS) enhancements for Evolved Universal Terrestrial Radio Access Network (E-UTRAN) access (Release 11)," 3GPP TS 23.401 V11.11.0 (Dec. 2014).
Third Generation Partnership Project, "Technical Specification Group Services and System Aspects; General Packet Radio Service (GPRS) enhancements for Evolved Universal Terrestrial Radio Access Network (E-UTRAN) access (Release 12)," 3GPP TS 23.401 V12.8.0 (Mar. 2015).
Third Generation Partnership Project, "Technical Specification Group Services and System Aspects; General Packet Radio Service (GPRS) enhancements for Evolved Universal Terrestrial Radio Access Network (E-UTRAN) access (Release 11)," 3GPP TS 23.401 V11.9.0 (Mar. 2014).
Third Generation Partnership Project, "Technical Specification Group Services and System Aspects; General Packet Radio Service (GPRS) enhancements for Evolved Universal Terrestrial Radio Access Network (E-UTRAN) access (Release 12)," 3GPP TS 23.401 V12.4.0 (Mar. 2014).
Third Generation Partnership Project, "Technical Specification Group Core Network and Terminals; Non-Access-Stratum (NAS) protocol for Evolved Packet System (EPS); Stage 3 (Release 8)," 3GPP TS 24.301 V8.10.0 (Jun. 2011).
Third Generation Partnership Project, "Technical Specification Group Core Network and Terminals; Non-Access-Stratum (NAS) protocol for Evolved Packet System (EPS); Stage 3 (Release 9)," 3GPP TS 24.301 V9.11.0 (Mar. 2013).
Third Generation Partnership Project, "Technical Specification Group Core Network and Terminals; Non-Access-Stratum (NAS) protocol for Evolved Packet System (EPS); Stage 3 (Release 10)," 3GPP TS 24.301 V10.15.0 (Sep. 2014).
Third Generation Partnership Project, "Technical Specification Group Core Network and Terminals; Non-Access-Stratum (NAS) protocol for Evolved Packet System (EPS); Stage 3 (Release 12)," 3GPP TS 24.301 V12.8.0 (Mar. 2015).
Third Generation Partnership Project, "Technical Specification Group Core Network and Terminals; Non-Access-Stratum (NAS) protocol for Evolved Packet System (EPS); Stage 3 (Release 11)," 3GPP TS 24.301 V11.14.0 (Mar. 2015).
Third Generation Partnership Project, "Technical Specification Group Core Network and Terminals; Non-Access-Stratum (NAS) protocol for Evolved Packet System (EPS); Stage 3 (Release 13)," 3GPP TS 24.301 V13.1.0 (Mar. 2015).

Third Generation Partnership Project, Technical Specification Group Services and System Aspects; Architecture Enhancements for Dedicated Core Networks; Stage 2 (Release 13), 3GPP TR 23.707 V0.2.0 (Jul. 2014).
Third Generation Partnership Project, "Technical Specification Group Services and System Aspects; Architecture Enhancements for Dedicated Core Networks; Stage 2 (Release 13)," 3GPP TR 23.707 V13.0.0 (Dec. 2014).
Third Generation Partnership Project, "Technical Specification Group Core Network and Terminals; Non-Access-Stratum (NAS) protocol for Evolved Packet System (EPS); Stage 3 (Release 12)," 3GPP TS 24.301 V12.4.0 (Mar. 2014).
Third Generation Partnership Project, "Technical Specification Group Core Network and Terminals; Non-Access-Stratum (NAS) protocol for Evolved Packet System (EPS); Stage 3 (Release 11)," 3GPP TS 24.301 V11.10.0 (Mar. 2014).
Third Generation Partnership Project, "Technical Specification Group Core Network and Terminals; Non-Access-Stratum (NAS) protocol for Evolved Packet System (EPS); Stage 3 (Release 10)," 3GPP TS 24.301 V10.13.0 (Mar. 2014).
Third Generation Partnership Project, "Technical Specification Group Core Network and Terminals; Mobile radio interface Layer 3 specification; Core network protocols; Stage 3 (Release 12)," 3GPP TS 24.008 V12.9.0 (Mar. 2015).
Third Generation Partnership Project, "Technical Specification Group Core Network and Terminals; Mobile radio interface Layer 3 specification; Core network protocols; Stage 3 (Release 6)," 3GPP TS 24.008 V6.20.0 (Mar. 2010).
Third Generation Partnership Project, "Technical Specification Group Core Network and Terminals; Mobile radio interface Layer 3 specification; Core network protocols; Stage 3 (Release 7)," 3GPP TS 24.008 V7.15.0 (Mar. 2010).
Third Generation Partnership Project, "Technical Specification Group Core Network and Terminals; Mobile radio interface Layer 3 specification; Core network protocols; Stage 3 (Release 8)," 3GPP TS 24.008 V8.19.0 (Jun. 2013).
Third Generation Partnership Project, "Technical Specification Group Core Network and Terminals; Mobile radio interface Layer 3 specification; Core network protocols; Stage 3 (Release 10)," 3GPP TS 24.008 V10.15.0 (Sep. 2014).
Third Generation Partnership Project, "Technical Specification Group Core Network and Terminals; Mobile radio interface Layer 3 specification; Core network protocols; Stage 3 (Release 9)," 3GPP TS 24.008 V9.12.0 (Sep. 2012).
Third Generation Partnership Project, "Technical Specification Group Core Network and Terminals; Mobile radio interface Layer 3 specification; Core network protocols; Stage 3 (Release 11)," 3GPP TS 24.008 V11.14.0 (Mar. 2015).
Third Generation Partnership Project, "Technical Specification Group Core Network and Terminals; Mobile radio interface Layer 3 specification; Core network protocols; Stage 3 (Release 10)," 3GPP TS 24.008 V10.13.0 (Mar. 2014).
Third Generation Partnership Project, "Technical Specification Group Core Network and Terminals; Mobile radio interface Layer 3 specification; Core network protocols; Stage 3 (Release 11)," 3GPP TS 24.008 V11.10.0 (Mar. 2014).
Third Generation Partnership Project, "Technical Specification Group Core Network and Terminals; Mobile radio interface Layer 3 specification;Core network protocols; Stage 3 (Release 12),"3GPP TS 24.008 V12.5.0 (Mar. 2014).
Third Generation Partnership Project, "Technical Specification Group Core Network and Terminals; 3GPP Evolved Packet System (EPS); Evolved General Packet Radio Service (GPRS) Tunnelling Protocol for Control plane (GTPv2-C); Stage 3 (Release 12)," 3GPP TS 29.274 V12.8.0 (Mar. 2015).
Third Generation Partnership Project, "Technical Specification Group Core Network and Terminals; 3GPP Evolved Packet System (EPS); Evolved General Packet Radio Service (GPRS) Tunnelling Protocol for Control plane (GTPv2-C); Stage 3 (Release 10)," 3GPP TS 29.274 V10.14.0 (Dec. 2014).
Third Generation Partnership Project, "Technical Specification Group Core Network and Terminals; 3GPP Evolved Packet System (EPS);

(56) References Cited

OTHER PUBLICATIONS

Evolved General Packet Radio Service (GPRS) Tunnelling Protocol for Control plane (GTPv2-C); Stage 3 (Release 8)," 3GPP TS 29.274 V8.11.0 (Dec. 2011).
Third Generation Partnership Project, "Technical Specification Group Core Network and Terminals; 3GPP Evolved Packet System (EPS); Evolved General Packet Radio Service (GPRS) Tunnelling Protocol for Control plane (GTPv2-C); Stage 3(Release 9)," 3GPP TS 29.274 V9.11.0 (Dec. 2012).
Third Generation Partnership Project, "Technical Specification Group Core Network and Terminals; 3GPP Evolved Packet System (EPS); Evolved General Packet Radio Service (GPRS) Tunnelling Protocol for Control plane (GTPv2-C); Stage 3 (Release 9)," 3GPP TS 29.274 V9.13.0 (Dec. 2014).
Third Generation Partnership Project, "Technical Specification Group Core Network and Terminals; 3GPP Evolved Packet System (EPS); Evolved General Packet Radio Service (GPRS) Tunnelling Protocol for Control plane (GTPv2-C); Stage 3 (Release 11)," 3GPP TS 29.274 V11.13.0 (Dec. 2014).
Third Generation Partnership Project, "Technical Specification Group Core Network and Terminals; Mobility Management Entity (MME)—Visitor Location Register (VLR) SGs interface specification (Release 9)," 3GPP TS 29.118 V9.9.0 (Sep. 2013).
Third Generation Partnership Project, "Technical Specification Group Core Network and Terminals; Mobility Management Entity (MME)—Visitor Location Register (VLR) SGs interface specification (Release 12)," 3GPP TS 29.118 V12.4.0 (Mar. 2014).
Third Generation Partnership Project, "Technical Specification Group Core Network and Terminals; Mobility Management Entity (MME)—Visitor Location Register (VLR) SGs interface specification (Release 12)," 3GPP TS 29.118 V12.7.0 (Dec. 2014).
Third Generation Partnership Project, "Technical Specification Group Core Network and Terminals; Mobility Management Entity (MME)—Visitor Location Register (VLR) SGs interface specification KRelease 10)," 3GPP TS 29.118 V10.12.0 (Dec. 2013).
Third Generation Partnership Project, "Technical Specification Group Core Network and Terminals; Mobility Management Entity (MME)—Visitor Location Register (VLR) SGs interface specification (Release 11)," 3GPP TS 29.118 V11.10.0 (Mar. 2014).
Third Generation Partnership Project, "Technical Specification Group Core Network and Terminals; Mobility Management Entity (MME)—Visitor Location Register (VLR) SGs interface specification (Release 10)," 3GPP TS 29.118 V10.13.0 (Jun. 2014).
Third Generation Partnership Project, "Technical Specification Group Core Network and Terminals; Mobility Management Entity (MME)—Visitor Location Register (VLR) SGs interface specification (Release 11)," 3GPP TS 29.118 V11.11.0 (Jun. 2014).
Third Generation Partnership Project, "Technical Specification Group Core Network and Terminals; Mobility Management Entity (MME)—Visitor Location Register (VLR) SGs interface specification (Release 8)," 3GPP TS 29.118 V8.11.0 (Sep. 2012).
Third Generation Partnership Project, "Technical Specification Group Core Network and Terminals; Mobility Management Entity (MME)—Visitor Location Register (VLR) SGs interface specification (Release 13)," 3GPP TS 29.118 V13.0.0 (Dec. 2014).
Third Generation Partnership Project, "Technical Specification Group Core Network and Terminals; 3GPP Evolved Packet System (EPS); Evolved General Packet Radio Service (GPRS) Tunnelling Protocol for Control plane (GTPv2-C); Stage 3 (Release 12)," 3GPP TS 29.274 V12.4.0 (Mar. 2014).
Third Generation Partnership Project, "Technical Specification Group Core Network and Terminals; 3GPP Evolved Packet System (EPS); Evolved General Packet Radio Service (GPRS) Tunnelling Protocol for Control plane (GTPv2-C); Stage 3 (Release 10)," 3GPP TS 29.274 V10.12.0 (Dec. 2013).
Third Generation Partnership Project, "Technical Specification Group Services and System Aspects; General Packet Radio Service (GPRS) enhancements for Evolved Universal Terrestrial Radio Access Network (E-UTRAN) access (Release 10)," 3GPP TS 23.401 V10.11.0 (Mar. 2014).
Third Generation Partnership Project, "Technical Specification Group Core Network and Terminals; 3GPP Evolved Packet System (EPS); Evolved General Packet Radio Service (GPRS) Tunnelling Protocol for Control plane (GTPv2-C); Stage 3 (Release 11)," 3GPP TS 29.274 V11.10.0 (Mar. 2014).
Third Generation Partnership Project, "Technical Specification Group Core Network and Terminals; 3GPP Evolved Packet System (EPS); Evolved General Packet Radio Service (GPRS) Tunnelling Protocol for Control plane (GTPv2-C); Stage 3 (Release 13)," 3GPP TS 29.274 V13.1.0 (Mar. 2015).
Third Generation Partnership Project, "Technical Specification Group Core Network and Terminals; Numbering, addressing and identification (Release 12)," 3GPP TS 23.003 V12.2.0 (Mar. 2014).
Third Generation Partnership Project, "Technical Specification Group Core Network and Terminals; Numbering, addressing and identification (Release 13)," 3GPP TS 23.003 V13.1.0 (Mar. 2015).
Third Generation Partnership Project, "Technical Specification Group Core Network and Terminals; Organization of subscriber data (Release 12)," 3GPP TS 23.008 V12.2.0 (Mar. 2014).
Third Generation Partnership Project, "Technical Specification Group Core Network and Terminals; Organization of subscriber data (Release 13)," 3GPP TS 23.008 V13.0.0 (Mar. 2015).
Third Generation Partnership Project, "Technical Specification Group Radio Access Network Evolved Universal Terrestrial Radio Access (E-UTRA) and Evolved Universal Terrestrial Radio Access Network (E-UTRAN);Overall description; Stage 2 (Release 12)," 3GPP TS 36.300 V12.1.0 (Mar. 2014).
Third Generation Partnership Project, "Technical Specification Group Radio Access Network Evolved Universal Terrestrial Radio Access (E-UTRA) and Evolved Universal Terrestrial Radio Access Network (E-UTRAN);Overall description; Stage 2 (Release 12)," 3GPP TS 36.300 V12.5.0 (Mar. 2015).
Third Generation Partnership Project, "Technical Specification Group Radio Access Network Evolved Universal Terrestrial Radio Access (E-UTRA); Radio Resource Control (RRC); Protocol specification (Release 12)," 3GPP TS 36.331 V12.1.0 (Mar. 2014).
Third Generation Partnership Project, "Technical Specification Group Radio Access Network Evolved Universal Terrestrial Radio Access (E-UTRA); Radio Resource Control (RRC); Protocol specification (Release 12)," 3GPP TS 36.331 V12.5.0 (Mar. 2015).

* cited by examiner

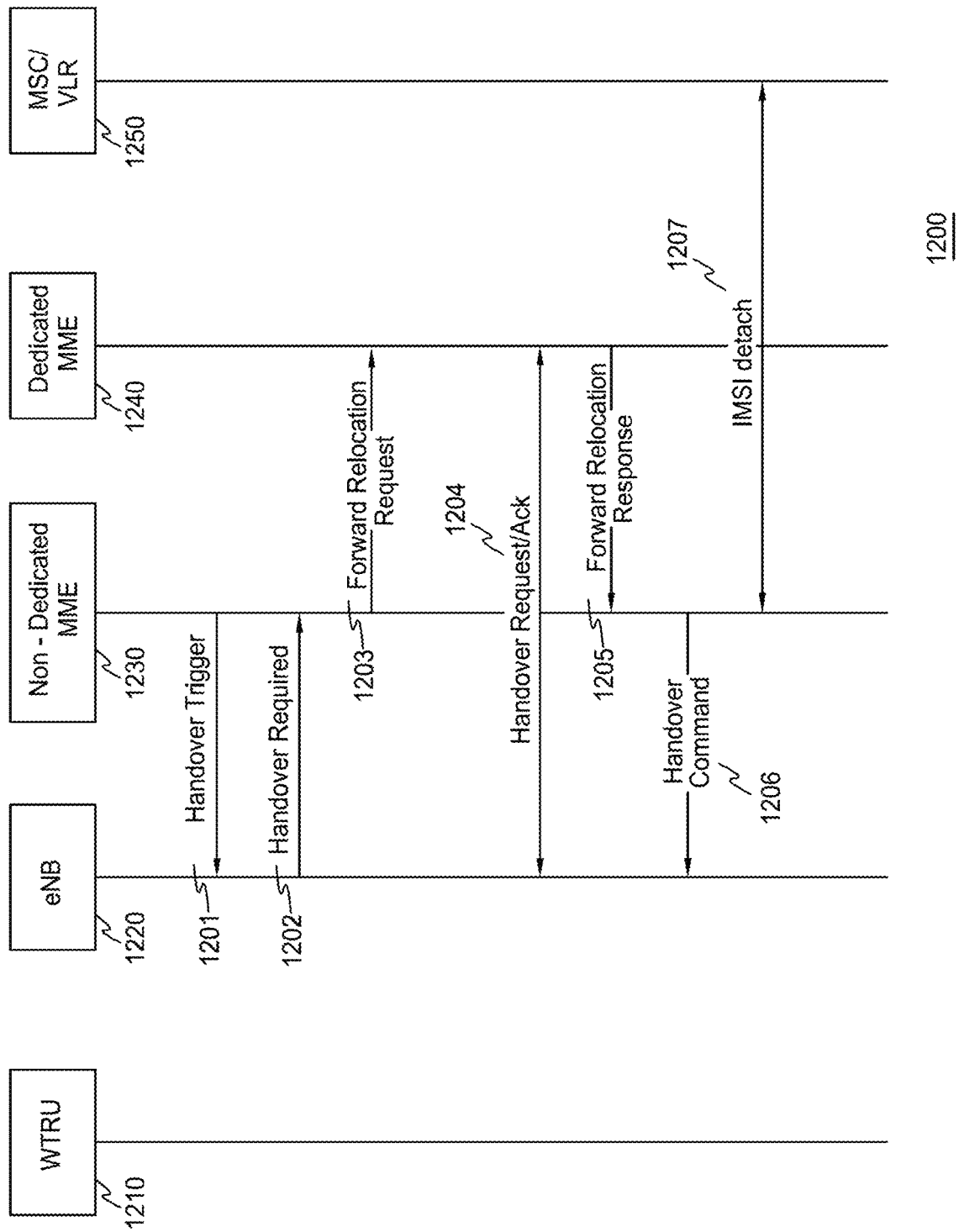

METHODS AND APPARATUS FOR SELECTION OF DEDICATED CORE NETWORK

CROSS REFERENCE TO RELATED APPLICATIONS

This application is a continuation of U.S. patent application Ser. No. 17/002,246, filed Aug. 25, 2020, which issued as U.S. Pat. No. 11,228,956 on Jan. 18, 2022, which is a continuation of U.S. patent application Ser. No. 16/385,529, filed Apr. 16, 2019, which issued as U.S. Pat. No. 10,757,626 on Aug. 25, 2020, which is a continuation of U.S. patent application Ser. No. 15/959,701, filed Apr. 23, 2018, which issued as U.S. Pat. No. 10,264,498 on Apr. 16, 2019, which is a continuation of U.S. patent application Ser. No. 15/309,574, filed Nov. 8, 2016, which issued as U.S. Pat. No. 9,955,393 on Apr. 24, 2018, which is the U.S. National Stage, under 35 U.S.C. § 371, of International Application No. PCT/US2015/029999, filed May 8, 2015, which claims the benefit of U.S. Provisional Application No. 61/990,543, filed May 8, 2014, U.S. Provisional Application No. 62/014,356, filed Jun. 19, 2014, and U.S. Provisional Application 62/017,628, filed Jun. 26, 2014, the contents of which are hereby incorporated by reference herein.

BACKGROUND

A wireless transmit/receive unit (WTRU) may run a variety of services and applications over cellular networks that are defined in The 3rd Generation Partnership Project (3GPP). An example of a service defined by 3GPP is voice. Some WTRUs, for example smart phones, are operated by humans and the WTRUs then execute 3GPP procedures. Examples of 3GPP procedures may include requesting an Internet protocol (IP) address or resources with a specific quality of service (QoS). However, other WTRUs may not necessarily interact with humans but may run applications that vary from smart meters to sensors, among others, and may be referred to as machine type devices which may communication via machine type communication (MTC).

Cellular operators are expected to operate their networks with an ever-increasing number of machine type devices, which may cause service issues as a result, such as increased load on the cellular system. Accordingly, cellular operators may prefer to deploy dedicated nodes that may only serve devices that match one or more specific characteristics, such as devices that are known to be machine type, that have a very predictable communication pattern, or whose IP connection is required to meet a specific communication model or treatment. By employing dedicated nodes, the cellular operator may ensure that WTRUs that are used by humans always get the expected QoS.

Cellular operators are expected to operate their networks with an ever-increasing number of M2M devices, which may cause service issues, such as increased load on the cellular system, as a result. Accordingly, cellular operators may prefer to deploy dedicated nodes that may only serve devices that have a specific characteristic. Examples of devices having a specific characteristic include devices that are known to be machine type, that have a very predictable communication pattern, or whose IP connection is required to meet a specific communication model or treatment. By employing dedicated nodes, the cellular operator may ensure that WTRUs that are used by humans, such as smart phones, always get the expected QoS.

SUMMARY

Disclosed is a method and apparatus configured to execute the method. The method may be for redirecting a wireless transmit receive unit (WTRU) to a dedicated core network (CN) node. An embodiment of the method may include determining, based on subscription information, that the WTRU should be redirected to the dedicated CN node. An embodiment of the method may further include receiving, from the WTRU, a service request, such as a service request for an Internet Protocol (IP) connection. An embodiment of the method may further include in response to the service request, allocating a global unique temporary identity (GUTI). An embodiment of the method may further include transmitting, to the WTRU, the GUTI in response to the service request.

In an embodiment of the method, the GUTI may include a null MME group identifier (null-MMEGI), wherein a value of the null-MMEGI may indicate the dedicated CN node.

An embodiment of the method may further include receiving, from the WTRU, a tracking area update (TAU) request. An embodiment of the method may further include redirecting the WTRU to the dedicated CN node based on the null-MMEGI in response to the TAU request.

In an embodiment of the method, the redirecting may include forwarding the TAU to the dedicated CN node.

An embodiment of the method may further include, in response to the determining, paging the WTRU to bring the WTRU into connected mode.

An embodiment of the method may further include receiving the subscription information from a home subscriber server (HSS), wherein the subscription information may be pushed subscription information.

In an embodiment of the method, the receiving the pushed subscription information may trigger the MME to execute the determining.

In an embodiment of the method, the pushed subscription information may indicate a change in the subscription information, and the pushed subscription information may indicate that the WTRU should be serviced by the dedicated CN node.

An embodiment of the method may further include paging the WTRU in response to the change in the subscription information.

In an embodiment of the method, the pushed subscription information may include a CN node type parameter that indicates a dedicated CN node type.

BRIEF DESCRIPTION OF THE DRAWINGS

A more detailed understanding may be had from the following description, given by way of example in conjunction with the accompanying drawings wherein:

FIG. 12 is a diagram of an example international mobile subscriber identity (IMSI) detach procedure when a dedicated MME does not support CSFB functionality.

DETAILED DESCRIPTION

Figure 1A:
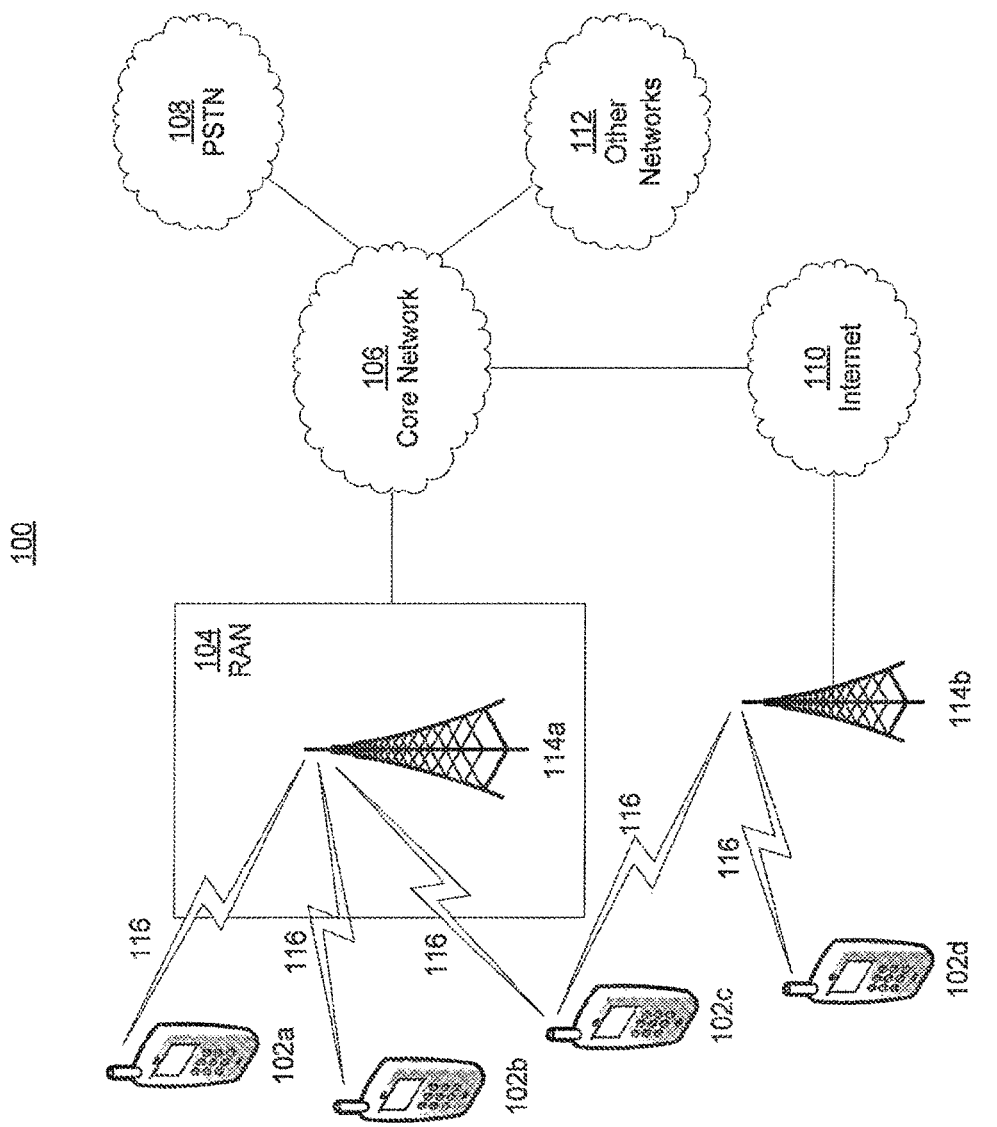
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the other networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple-output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
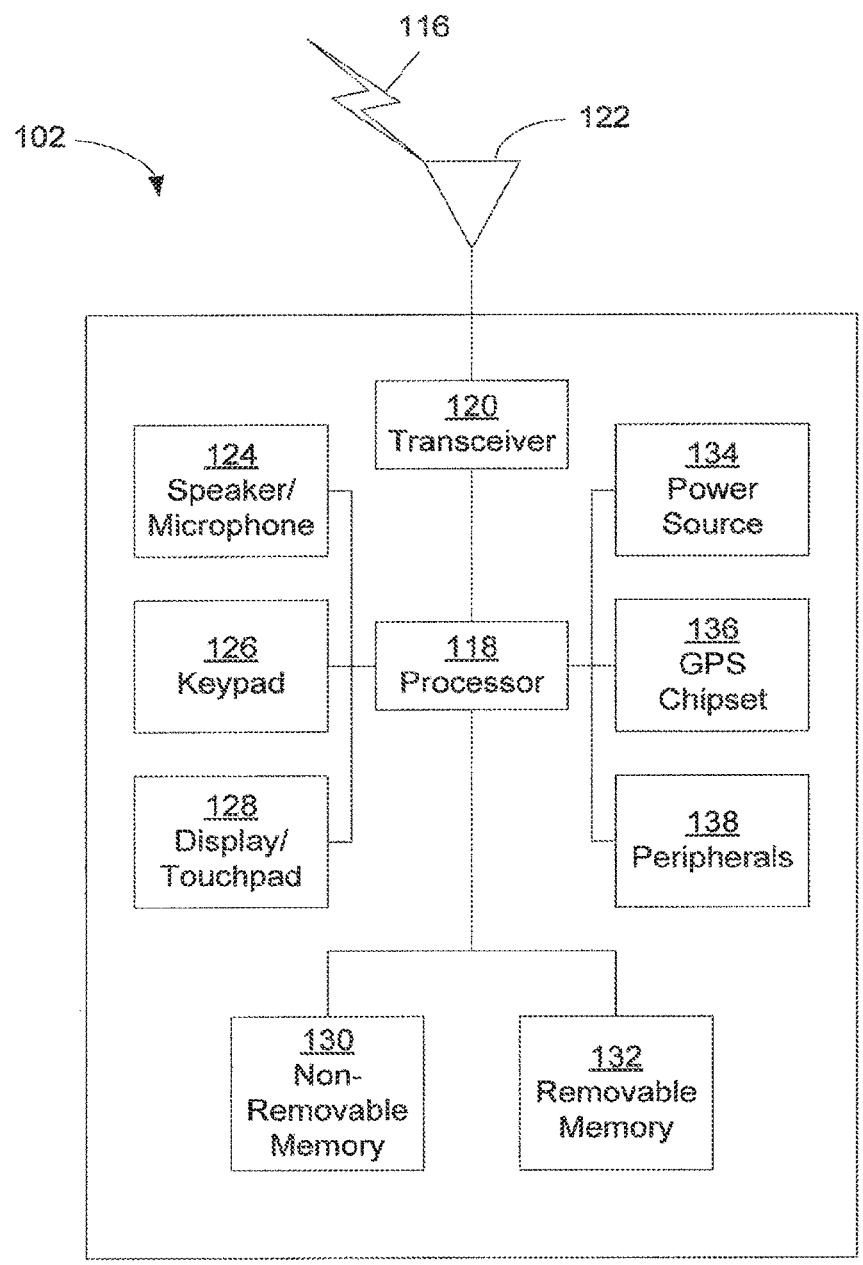
FIG. 1B is a system diagram of an example wireless transmit/receive unit (WTRU) that may be used within the communications system illustrated in FIG. 1A.
Figure 1C:
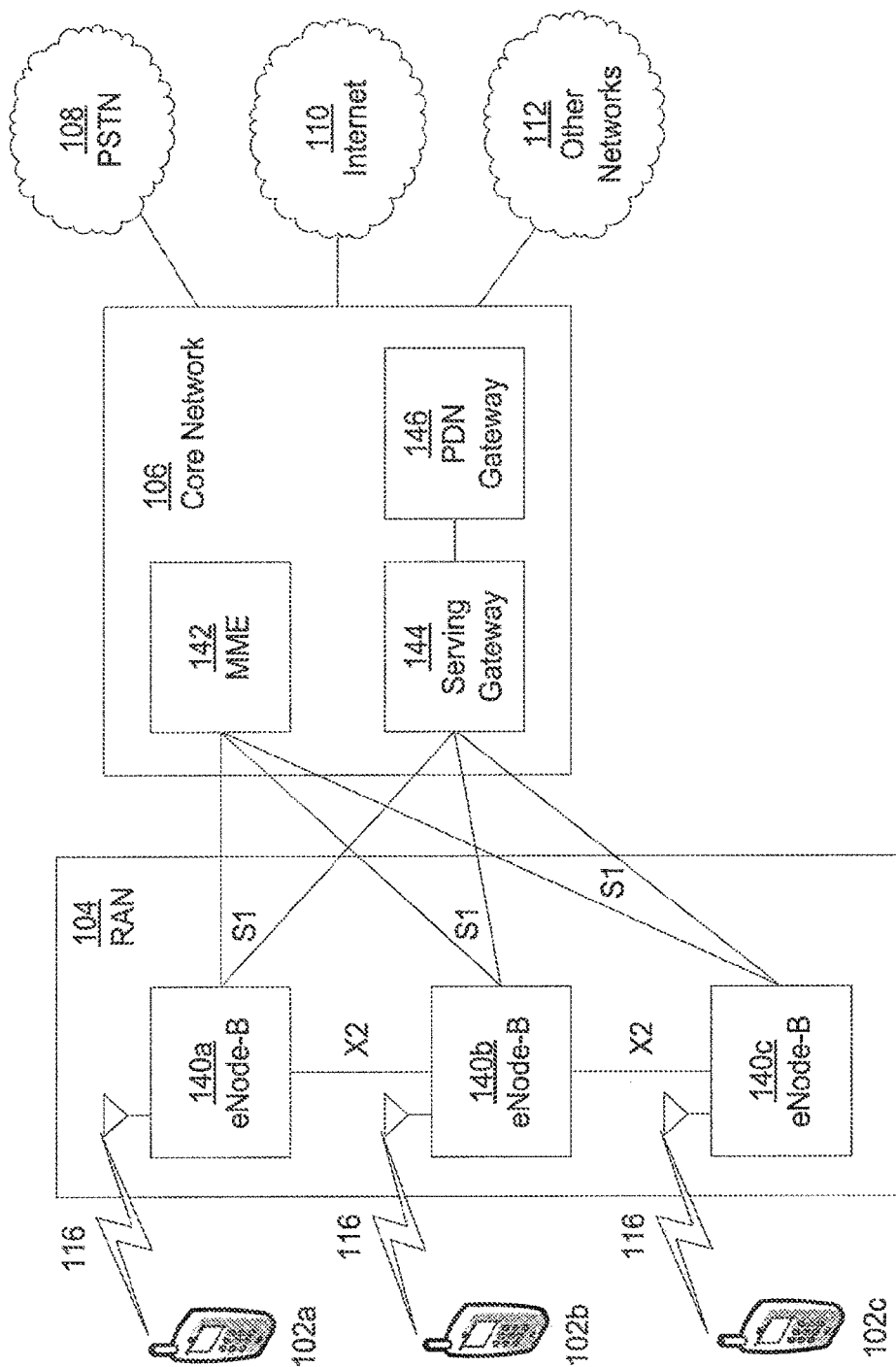
FIG. 1C is a system diagram of an example radio access network and an example core network that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

FIG. 10 is a system diagram of the RAN 104 and the core network 106 according to an embodiment. As noted above, the RAN 104 may employ an E-UTRA radio technology to communicate with the WTRUs 102a, 102b, 102c over the air interface 116. The RAN 104 may also be in communication with the core network 106.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNode-Bs 140a, 140b, 140c may be associated with a particular cell (not shown) and may be configured to handle radio resource management decisions, handover decisions, scheduling of users in the uplink and/or downlink, and the like. As shown in FIG. 10, the eNode-Bs 140a, 140b, 140c may communicate with one another over an X2 interface.

The core network 106 shown in FIG. 10 may include a mobility management entity gateway (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 140a, 140b, 140c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNode Bs 140a, 140b, 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

In order for a cellular network operator to service WTRUs that have a certain characteristic with a dedicated CN node, such WTRUs may need to be redirected to the dedicated CN node. A dedicated CN node may include an MME, serving gateway (SGW), or packet data network gateway (PGW). This redirection of WTRUs may be done based on subscription information, which may be stored at a home subscriber server (HSS). The MME may download the subscription information when the WTRU registers or attaches to the network.

A WTRU that is running a machine type application or is otherwise of low priority may normally indicate that it is a low access priority device (LAPD) using an LAPD indication, which the WTRU may signal when it first accesses the network. The WTRU may signal its low access priority status at the radio (i.e., radio resource control (RRC)) and non-access stratum (NAS) levels. The network may use this indication to take certain measures if needed, for example to apply congestion control by providing such devices with back-off indications and timers. However, for an LAPD that is to be redirected to a dedicated CN node, the system information (SI) may not make use of WTRU indications but may rely on subscription information. The subscription information may contain an indication that the device in question should be served by a dedicated CN node. Since the subscription information may change at any time, the time at which a WTRU may be redirected toward a specific CN node may not be defined. Redirection may take place, for example, when any of the following procedures occur: attach, tracking area update (TAU), routing area update (RAU), Service Request, intra-RAT idle mode mobility, inter-RAT idle mode mobility, intra-RAT handover, inter-RAT handover, roaming or a sharing network scenario. A Service Request may, for example, request an IP connection.

The IP connection may establish a data connection to communicate data to and/or from the WTRU.

Example methods of WTRU redirection to a dedicated CN node are described below with respect to FIGS. 2, 3, 4, 5 and 6.

Figure 2:
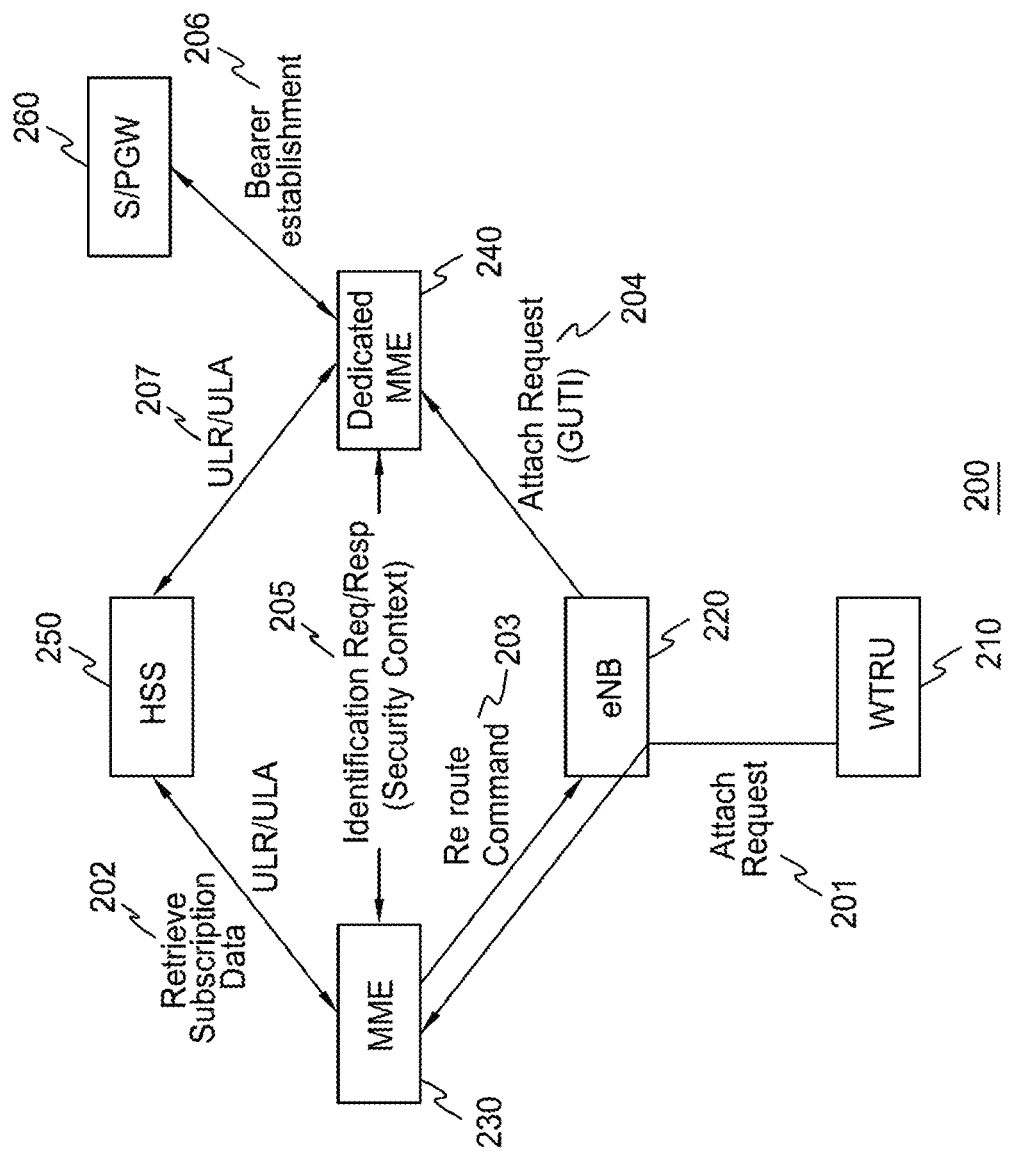
FIG. 2 is a diagram of an example method of WTRU redirection to a dedicated core network (CN) node at attach.

FIG. 2 is a diagram of an example embodiment of a method of WTRU redirection to a dedicated CN node at attach. In the embodiment shown in FIG. 2, the WTRU 210 may transmit an Attach Request 201 to an eNB 220 which may then forward the Attach Request 201 to an MME 230. The Attach Request 201 may include an IMSI. The MME 230 may contact an HSS 250 and exchange Update-Location-Request/Answer (ULR/ULA) commands 202 with the HSS. The MME may retrieve the WTRU subscription profile 202 from the HSS 250. The subscription profile may include an indication that the WTRU should be redirected to a dedicated CN node. The HSS 250 may inform the MME 230 that the WTRU 210 may select a CN node type in the subscription data.

The MME 230 may then send an S1AP reroute command message 203 to the eNB 220 in which the CN node type parameter and global unique temporary identity (GUTI) may be provided. The IMSI-based attach may be converted to a GUTI-based Attach Request 204. The eNB 220 may select a dedicated MME 240 based on the CN node type and send the GUTI-based Attach Request 204 to the dedicated MME 240. The dedicated MME 240 may contact the first MME 230, retrieve the security parameters 205 and then continue with the attach procedure. It is possible for the dedicated MME 240 to communicate with the WTRU 210 by using the first MME's security key. The dedicated MME 240 may also select a new SGW or PGW 260 and establish bearers 206. The dedicated MME 240 may also contact the HSS 250 to perform ULR/ULA commands 207 to update the location information of the WTRU 210 in the HSS 250.

Although the example method depicted in FIG. 2 shows messages and/or steps in a particular order, it should be recognized that not all messages and/or steps may be necessary and the particular order may be different. Furthermore, whereas steps and/or messages may be depicted as separate events, the steps and/or messages may be combined as a single event. Likewise, a single event may be broken out into multiple events.

Figure 3:
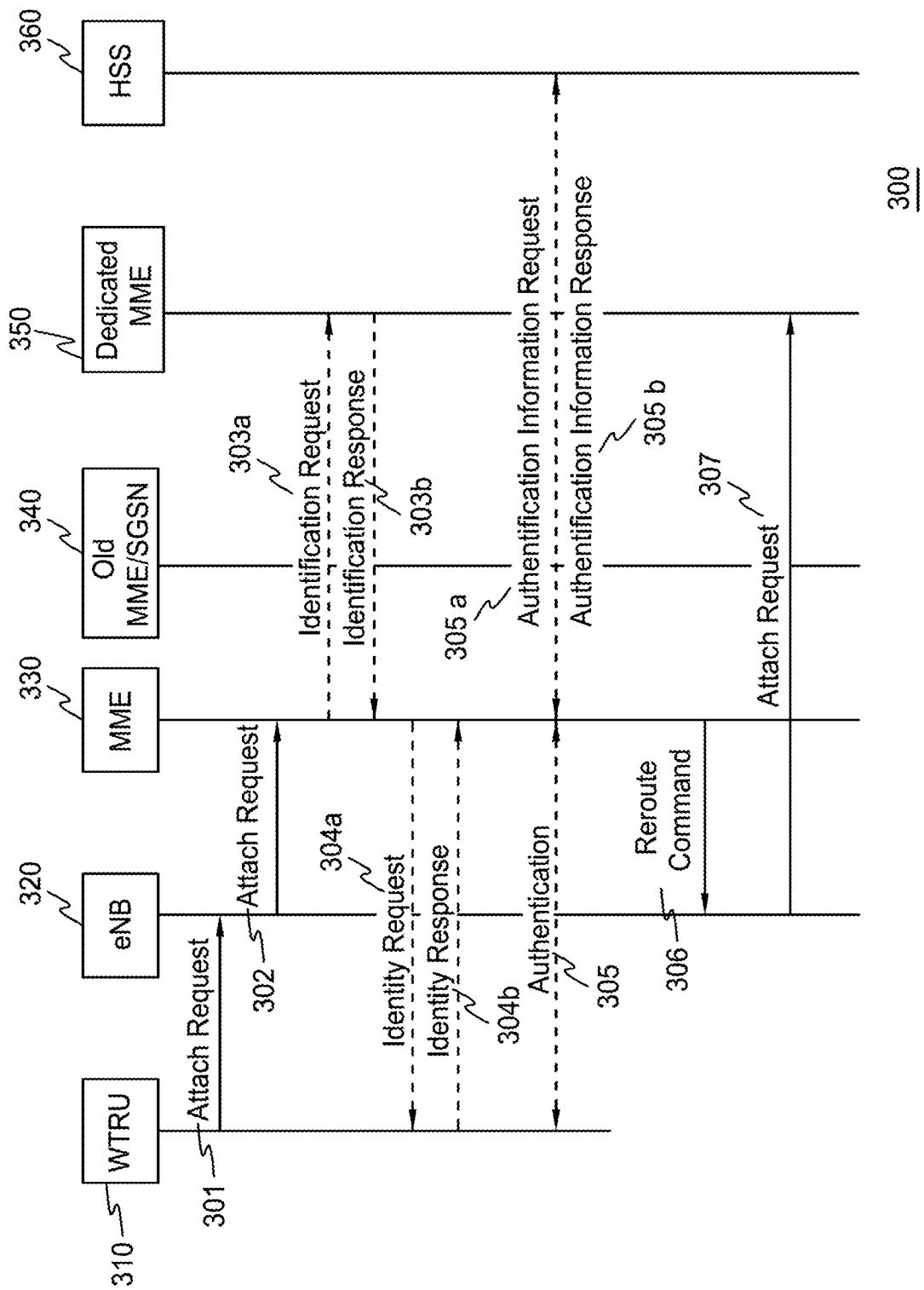
FIG. 3 is a diagram of an example method of WTRU redirection to a dedicated CN node after authentication information request/response.

FIG. 3 is a diagram of another example method of WTRU redirection to a dedicated CN node. In the example illustrated in FIG. 3, the WTRU 310 may send an Attach Request 301 to the eNB 320. The eNB 320 may then forward the Attach Request 302 to an MME 330. The MME 330 may then exchange Identity Request/Response messages 303a and 303b, for example with the old MME/SGSN 340 or the WTRU 310, to obtain the IMSI. The WTRU 310, MME 330, and HSS 360 may exchange Authentication Information messages 305 including an Authentication Information Request 305a and Authentication Information Response 305b. The MME 330 may receive the CN type parameter from the HSS 360 when receiving the Authentication Information Response message 305b. The MME 330 may then send a reroute command message 306 to the eNB 320, which may include the Attach Request Message and the Core Network Type parameter indicating a dedicated CN type. The eNB 320 may then send an Attach Request message 307 to a dedicated MME 350.

Although the example method depicted in FIG. 3 shows messages and/or steps in a particular order, it should be recognized that not all messages and/or steps may be necessary and the particular order may be different. Furthermore, whereas steps and/or messages may be depicted as separate events, the steps and/or messages may be combined as a single event. Likewise, a single event may be broken out into multiple events.

Figure 4:
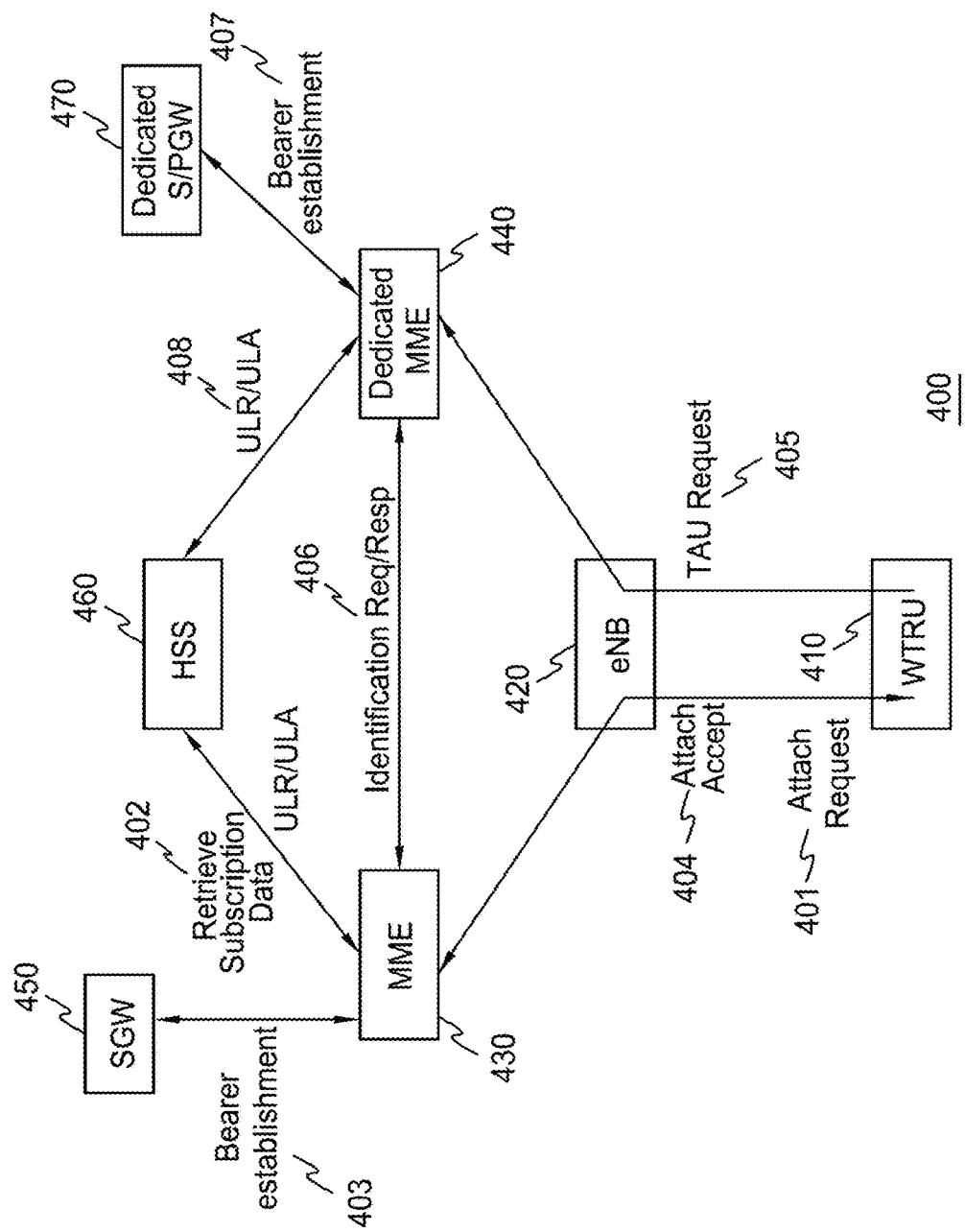
FIG. 4 is a diagram of an example method of WTRU redirection to a dedicated CN node using a specific global unique temporary identity (GUTI) and a non-broadcast tracking area identity (TAI)

FIG. 4 is a diagram of an example method of WTRU redirection to a dedicated CN node using a specific GUTI, which may be allocated by an MME, and a non-broadcast tracking area identity (TAI). The GUTI may be made up of identities in accordance with the following:

GUTI=<PLMN ID><MME Group ID><MME Code><$M$-TMSI>, where PLMN is an abbreviation for Public Land Mobile Network, and M-TMSI is an abbreviation for a unique Temporary Mobile Subscriber Identity (TMSI) within the MME that allocated the GUTI.

The M-TMSI is a unique 4 octet value that may identify the WTRU within the MME and the MME Code (1 octet) represents the specific MME within the identified MME Group ID (2 octets). The Globally Unique MME Identifier (GUMMED, may be made up of identities in accordance with the following:

GUMMEI=<PLMN ID><MME Group ID><MME Code>.

Hence, the GUTI may also be expressed as:

GUTI=<GUMMEI><$M$-TMSI>.

In the example illustrated in FIG. 4, the WTRU 410 may transmit an Attach Request 401 to the eNB 420 which may then forward the Attach Request 401 to an MME 430. The MME 430 may contact an HSS 460 and exchange Update-Location-Request/Answer (ULR/ULA) commands with the HSS 460. The MME 430 may retrieve the WTRU subscription data 402 from the HSS 460. The subscription data 402 may include an indication that the WTRU 410 should be redirected to a dedicated CN node. The HSS 460 may inform the MME 430 that the WTRU 410 may select a CN type parameter in the subscription data. The MME may establish bearers 403 for communicating with the SGW 450.

The MME 430 may allocate a specific GUTI, which may include the mobility management entity group identifier (MMEGI) of the dedicated MME 440 and send it to the WTRU 410, for example through the eNB 420, in an Attach Accept message 404. The WTRU 410 may then eventually send a TAU Request 405 with the MMEGI of the dedicated MME 440. The MME 430 may also send a non-broadcast TAI, for example 0000 or FFFF, to cause the WTRU 410 to perform the TAU request 405. The MME 430 may also have a MMEGI. The MMEGI of the MME 430 and the dedicated MME 440 may be pre-configured. The eNB 420 may route the TAU Request 405 to the dedicated MME 440 based on the MMEGI. The dedicated MME 440 may then perform an identification procedure 406 with the MME 430 to get context information from the MME 430. The dedicated MME 440 may establish bearers 407 for communicating with the dedicated S/PGW 470. The dedicated MME 440 may also contact the HSS 460 to perform ULR/ULA commands 408 to update the location information of the WTRU 410 in the HSS 460.

Although the example method depicted in FIG. 4 shows messages and/or steps in a particular order, it should be recognized that not all messages and/or steps may be necessary and the particular order may be different. Furthermore, whereas steps and/or messages may be depicted as separate events, the steps and/or messages may be combined as a single event. Likewise, a single event may be broken out into multiple events.

Figure 5:
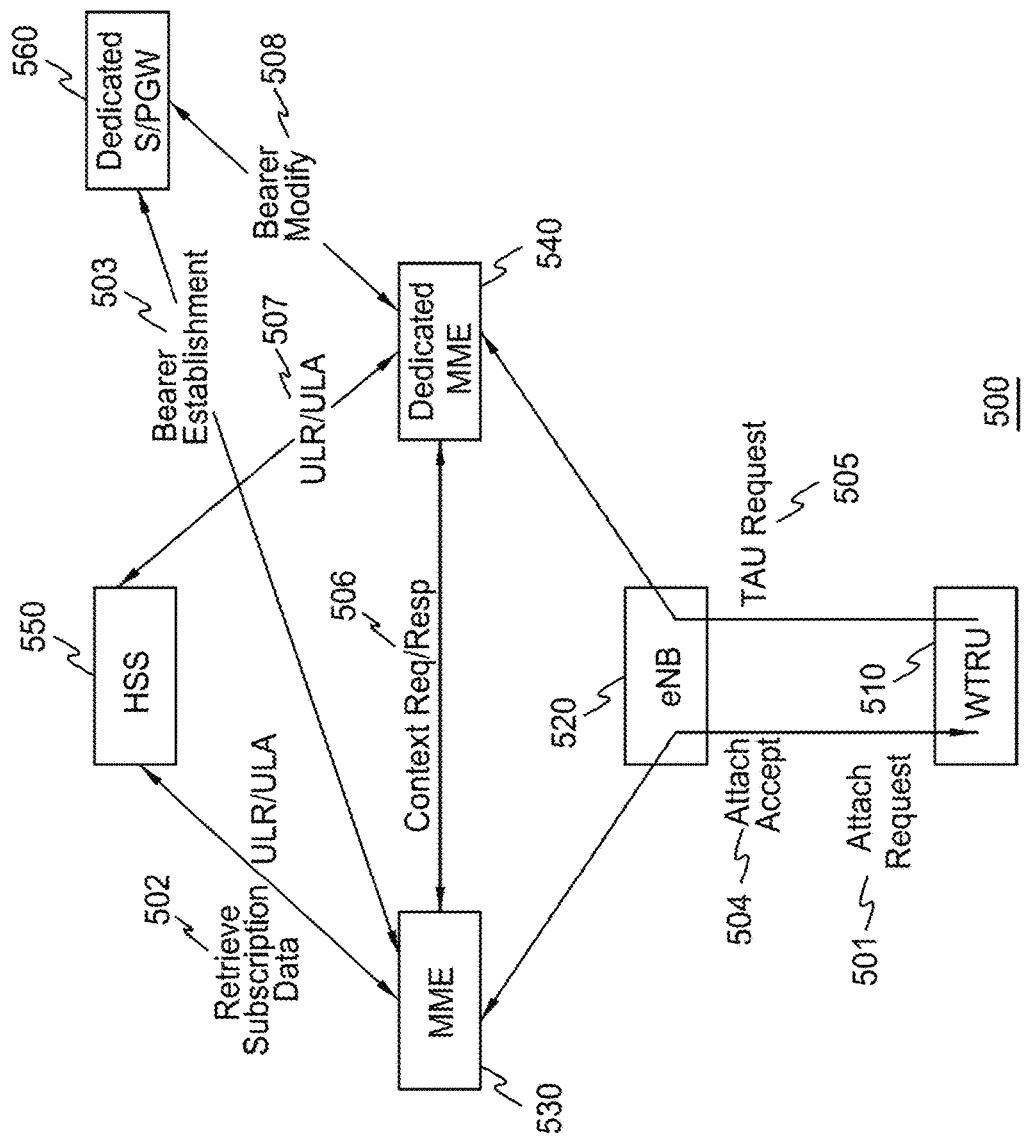
FIG. 5 is a diagram of an example method of WTRU redirection to a dedicated CN node using a null mobility management entity group identifier (MMEGI)

FIG. 5 is a diagram of an example method of WTRU redirection to a dedicated CN node using a null-MMEGI. The example illustrated in FIG. 5 is similar to the example illustrated in FIG. 4 except that, in this example, the MME 530 may allocate a specific GUTI that includes a null-MMEGI of the network that the dedicated MME 540 belongs to plus the MME code (MMEC) of the MME 530. When the WTRU 510 performs a TAU Request 505, the eNB 520 may route the TAU Request 505 to the dedicated MME 540 according to the null-MMEGI. The dedicated MME 540 may then contact the MME 530 since the MMEC was contained in the GUTI and may start the context request/response procedure 506.

Although the example method depicted in FIG. 5 shows messages and/or steps in a particular order, it should be recognized that not all messages and/or steps may be necessary and the particular order may be different. Furthermore, whereas steps and/or messages may be depicted as separate events, the steps and/or messages may be combined as a single event. Likewise, a single event may be broken out into multiple events.

Figure 6:
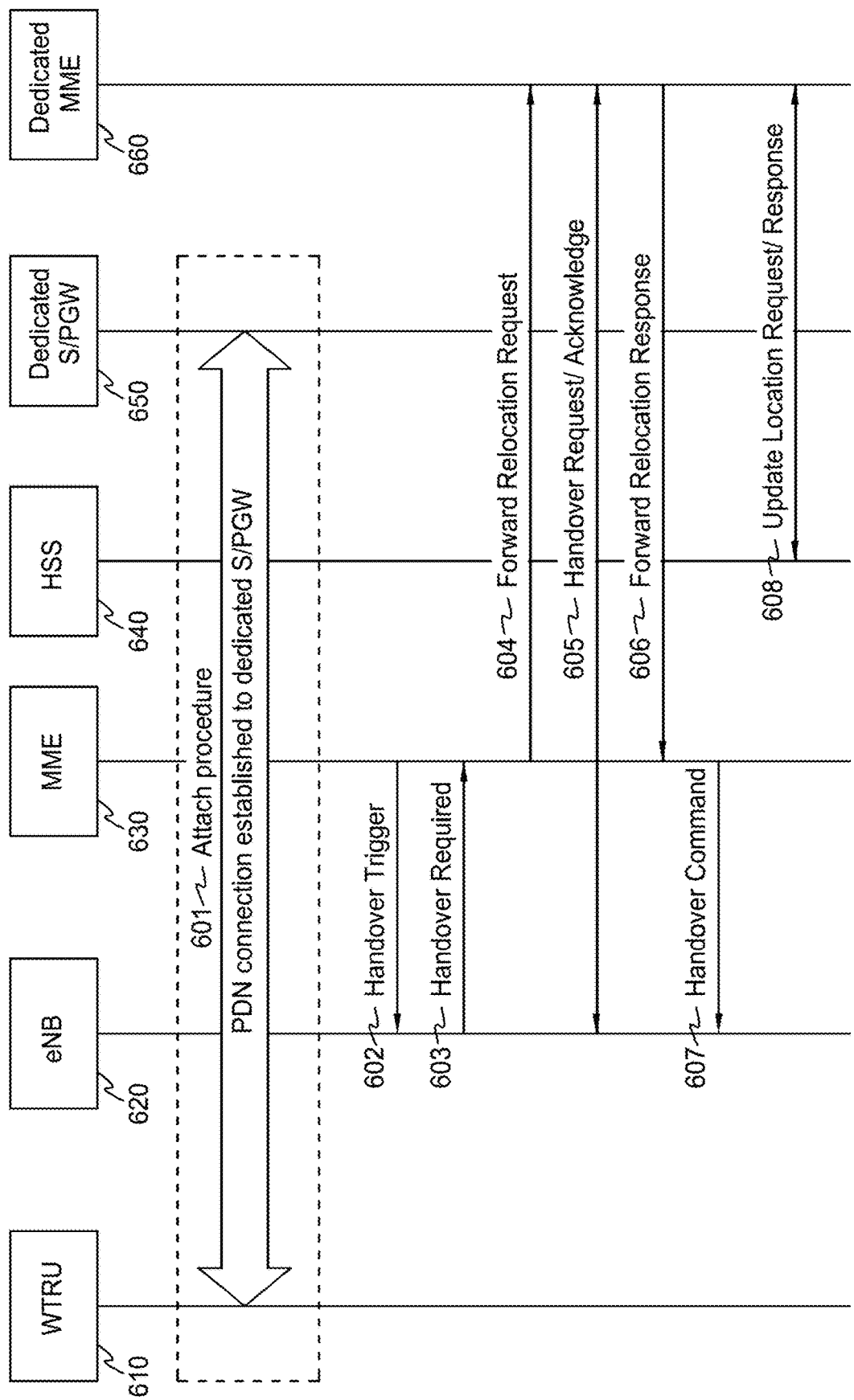
FIG. 6 is a diagram of an example method of WTRU redirection to a dedicated CN node using MME-triggered S1 handover.

FIG. 6 is a diagram of an example method of WTRU redirection to a dedicated CN node using MME-triggered S1 handover. In the example illustrated in FIG. 6, an attach procedure 601 is performed. In this example, the MME 630 may establish a packet data network (PDN) connection with the dedicated S/PGW 650 based on PDN connection information in the subscription information provided by the HSS 640. Once the attach procedure 601 is completed, the MME 630 may trigger a handover 602 toward the dedicated MME 660 using a new message on the S1 interface. However, the serving cell and eNB 620 may not change as a part of the handover. The MME 630 may send a Forward Relocation Request 604 to the dedicated MME 660. The dedicated MME 660 and the eNB 620 may then exchange Handover Request/Acknowledge messages 605. The dedicated MME 660 may then send a Forward Relocation Response 606 to the MME 630. The MME 630 may then send a Handover Command 607 to the eNB 620. The dedicated MME 660 may then exchange Update Location Request/Response messages 608 with the HSS 640.

Though not depicted in FIG. 6, measurements, data forwarding, status transfers, SGW relocation, and handover notification steps may be included in the example method of FIG. 6. Furthermore, although the example method depicted in FIG. 6 shows messages and/or steps in a particular order, it should be recognized that not all messages and/or steps may be necessary and the particular order may be different. Furthermore, whereas steps and/or messages may be depicted as separate events, the steps and/or messages may be combined as a single event. Likewise, a single event may be broken out into multiple events.

Additional procedures may be implemented to augment the examples described above with respect to FIGS. 2, 3, 4, 5 and 6. For example, a mechanism may be implemented which routes a security context from one MME to another, where the source MME may initiate the routing. A target MME may request WTRU context/security parameters from a source MME. Additionally, a WTRU may request a dedicated bearer activation before an attach procedure completes. The system may need to execute this procedure such that it is forwarded or finally executed by the dedicated MME.

For embodiments that include the WTRU performing a TAU in order for the eNB to select a dedicated CN node, a WTRU may remain served by a sub-optimal CN node for a long time because it may take a long time to execute this procedure.

In addition, some WTRUs may perform combined registration to the packet-switched (PS) and circuit-switched (CS) domains via an MME, which may register the WTRU for the PS domain and then contact the mobile switching center (MSC)/visitor location register (VLR) to register the WTRU in the CS domain. While the MME may be a dedicated MME for this device, the MSC/VLR may not be, and, therefore, a better choice for the MSC/VLR may be made. Mechanisms may be needed to address this scenario.

Also, a WTRU may be switched back from a dedicated CN node to a non-dedicated CN node for a number of different reasons. For example, the dedicated CN node may be overloaded or malfunctioning due to hardware or software failure, or the WTRU may be scheduled to stay with a dedicated CN node for a configured period of time. A mechanism may switch the WTRU from the dedicated CN node to a non-dedicated CN node.

Further, since diverse classes of devices may have different traffic characteristics and data usage requirements, separate dedicated CN nodes may be needed to efficiently support these classes. However, a device may not necessarily be limited to a single type of traffic or data usage. The device may support various types of activities and behaviors over its lifetime. For example, a device may be configured to run machine type applications, for example reporting automated measurements, at one point in time, while at another point in time the same device may be used with human interaction for a different type of service/application. In this case, the device may be redirected from one dedicated CN node to another in order to meet the communication requirements/characteristics of the specific service the device is currently using. Thus, a mechanism to support the relocation of a WTRU from one dedicated CN node to another may be needed.

In addition, a WTRU may be redirected to a dedicated CN node after an attach/TAU/RAU procedure using a CN triggered handover that may change the MME to which the eNB connects. This procedure may be transparent to the WTRU. However, during the attach/TAU/RAU, a first, serving MME may have allocated a GUTI that maps to the first, serving MME itself. Thus, if a CN-triggered handover is performed, the GUTI of a WTRU may be the same GUTI provided by the first, serving MME. The implications of this may be that when the WTRU later enters an idle mode, for example after its CN node has been redirected, it may send a Service Request message to transition to a connected mode. As part of the Service Request procedure, the WTRU may use its SAE temporary mobile subscriber identity (S-TMSI) in the RRC connection establishment procedure, for example in the RRC connection request message that is sent to the eNB, wherein S-TMSI=<MMEC><$M$-TMSI>.

The S-TMSI may identify the specific MME that has the WTRU context. Thus, if, after the CN-triggered handover, the GUTI is not re-allocated, the identities of a WTRU may point to the old MME, which may have deleted the context of the WTRU since a dedicated CN has already been selected per the CN-triggered handover.

Additionally, a WTRU that is already registered or attached to the system may be allocated a GUTI, part of which may be the S-TMSI. During an RRC establishment procedure for sending a NAS message, for example a TAU or Service Request, the WTRU may include the S-TMSI in the RRCConnectionRequest message. The GUMMEI may be included in the RRCConnectionSetupComplete message. After the eNB receives the RRCConnectionSetupComplete message, the eNB may have both the S-TMSI and the GUMMEI. The GUMMEI may point to the registered PLMN and the MME group, while the S-TMSI may contain the MME code that points to the specific MME within the MME group as identified by the MMEGI.

In the case of null-MMEGI, the eNB may receive a null-MMEGI that points to a dedicated MME and an S-TMSI that points to the non-dedicated MME that currently has the WTRU context, for instance the MME that allocated the GUTI with the null-MMEGI. Thus, the NAS message, for example the TAU or Service Request, may be forwarded to the dedicated MME based on the null-MMEGI. If the NAS message is a TAU, the TAU may force the dedicated MME to fetch the WTRU's context from the non-dedicated MME. However, if the NAS message is a Service Request and this NAS message is sent to the dedicated MME, the dedicated MME may not be able to fetch the WTRU's context. Therefore, the MME may reject the WTRU possibly with a cause code "#9—WTRU identity cannot be derived by the network" that may cause the WTRU to re-attach to the system and also delete its allocated GUTI which points to the dedicated CN. In this scenario, the process may be restarted again.

The use of a dedicated CN node may take several forms. For example, a dedicated CN may include the use of a dedicated MME, a dedicated SGW, and a shared PGW. In another network, the policy to use a dedicated CN may also include the use of dedicated PGW. If a WTRU is already registered or attached to the system, its PGW may already be selected. Generally, PGW selection may occur during the attach procedure. Thus, if a WTRU is required to use a dedicated PGW, the WTRU may perform PGW selection again. As a result, the WTRU may perform a re-attach procedure. It may also be possible for the WTRU to reselect a PGW without the WTRU performing a re-attach. If the WTRU performs a re-attach, this re-attach may be done at the serving MME or may be done at the dedicated MME. Both options may have certain advantages and disadvantages. For example, if the re-attach is performed at the serving MME, which may be a non-dedicated MME, the serving MME may incur this signaling. After the attach procedure is completed the serving MME may attempt to redirect the WTRU to a dedicated MME. Moreover, an appropriate PGW may have been selected by the previous serving MME. Since the purpose of the redirection may be to relieve the non-dedicated MME from this WTRU, this embodiment may force some signaling on the non-dedicated MME. Thus, different methods may be used for re-attaching the WTRU at either the source non-dedicated MME or at the target dedicated MME after redirection.

If a WTRU is registered both in an MME and an MSC/VLR for the use of circuit switched fallback (CSFB), an MME initiated S1 handover, as described above, may relocate the WTRU to a dedicated MME. However, the WTRU may not be able to use CSFB because the dedicated MME may not have the CSFB context and the VLR may maintain the SGW associated with the old MME. Thus, a method to establish an SGW association between the new dedicated MME and the MSC/VLR is desired.

Embodiments are described herein that may provide procedures and mechanisms to enable redirection of a WTRU to a dedicated CN node, for example, according to the examples described above with respect to FIGS. 2, 3, 4, 5, and 6. The embodiments described below are described in the context of LTE as the RAT. However, these embodiments may be applicable to any RAT.

In an example embodiment of a method for facilitating redirection to a dedicated CN, a periodic timer with a shorter set time may be used. A periodic timer is a timer that is started at a WTRU when a signaling connection, for example the NAS signaling connection, is released with the serving CN node, for example the MME. In LTE, for example, the periodic TAU timer is a general packet radio service (GPRS) timer defined to have a range of values from 2 seconds to 3 hours and 6 minutes. For example, when an MME determines from available information that the WTRU should be redirected toward a dedicated CN node, or when the MME allocates a special GUTI or GUMMEI, the MME may allocate a short periodic timer period. For instance, the MME may allocate a timer period that is shorter than the default value, which is 54 minutes for the TAU timer in LTE. This may allow a WTRU to be more quickly redirected to the dedicated CN node since the WTRU may perform the periodic TAU in a shorter time period than it would have had the default value been used.

AN MME is described in the previous embodiment; however, the embodiment may be applicable for a UMTS/GERAN case where a serving GPRS support node (SGSN) may be the serving node for the PS domain, and the periodic timer may be referred to as a periodic RAU timer. An MSC/VLR may be the NAS entity in the CS domain where the corresponding timer is called the periodic location area update (LAU) timer.

In another embodiment, the network may inform the WTRU whether it is a dedicated network or not. The network may send an indication using broadcast or dedicated signaling. Broadcast signaling may make use of RRC messages, for example system information blocks (SIBs), whereas dedicated signaling may be achieved using either RRC and/or NAS messages. For example, a new information element (IE) may be included in any NAS message to indicate if the CN node is a dedicated CN node or not. This IE may be included in the Attach Accept message, the TAU Accept message, or any NAS session management message. Based on this indication, the WTRU may decide to perform a re-registration (either with an Attach or TAU Accept message) so that the RAN may choose a different/dedicated CN node.

The WTRU may also provide a dedicated CN indication to the eNB so that the eNB knows to forward the NAS message to an appropriate, dedicated CN node. The WTRU may provide such an indication in an RRC message, such as an RRC connection request message or an RRC connection setup complete message. The WTRU may be configured to use a dedicated CN node or may be configured to provide an indication about it being subject to the use of a dedicated CN node, using an access network discovery and selection function (ANDSF), an Open Mobile Alliance device management (OMA DM) procedure, a short messaging service (SMS), or any other configuration method, or it may be preconfigured in the universal integrated circuit card (UICC)/mobile equipment (ME).

If the eNB receives an indication that a WTRU is subject to being served by a dedicated CN node, the eNB may select a dedicated CN node to which the NAS message is forwarded. The eNB may also receive an identity (which may be included by the WTRU in the same manner described above), which the eNB may use to resolve the specific CN node to which the WTRU's NAS message is sent. Alternatively, the eNB may be configured with addresses of dedicated CN nodes, and the eNB may choose a dedicated node using this configuration. Alternatively, the choice of a CN node may be a function of or dependent on an indication or identity provided by the WTRU as described above.

Additionally or alternatively, the WTRU may use a new establishment cause to indicate that it is subject to the selection of a dedicated CN node if the WTRU is configured to use a dedicated CN node. The NAS layer messages may include this information and may provide an establishment cause to the RRC layer. Optionally, a new call type may be defined, such as dedicated CN signaling or dedicated CN data, to indicate to the RRC that the WTRU should use a dedicated CN node. The RRC may then set or include certain RRC parameters accordingly. Examples of parameters may include an establishment cause and/or other indications as described above. Also, the WTRU may use a special random number in the RRC connection request message instead of the S-TMSI when the network broadcasts that it is a dedicated node. This special random number may, for example, be recognized by the eNB by means of a pre-defined sequence of bits. For example, the most significant bits of the random number having said pre-defined sequence. Having received an RRC connection request with said special random number, the eNB may then be able to either route the initial NAS message to a dedicated node or notify the first MME that the WTRU is subject to dedicated CN node selection.

In addition, when a WTRU indicates to the eNB that it is configured to use a dedicated CN node, the eNB may pass that information to the first MME. This way, if the MME already is a dedicated CN node, the MME may continue with the attach procedure and, if not, it may then request or command the eNB to reroute the attach message to another MME.

If the WTRU has asked for a combined attach, the MME may establish the SGW's association with the VLR. This way, the WTRU, following one of the previous solutions, may perform a TAU later, and that TAU may be a combined one, which may cause the new relay MME to contact the VLR and also establish the SGW's association.

Alternatively, the first MME may not contact the VLR and, instead, may inform the WTRU in the Attach Accept message that a new CS registration is recommended or needed. The Attach Accept message may include, for example, a new IE or a new cause. This may be particularly useful where sharing is deployed in the CN and the sharing operators have agreed to use designated entities for the dedicated CN nodes.

A re-route option was described above where a CN node, such as an MME, informs the eNB to route an NAS message to another CN entity that is a known dedicated CN node or is expected to be a dedicated CN node. In an embodiment, the new MME may obtain the WTRU's NAS message, such as the Attach Request, the authentication context, vectors, or any general security context. Therefore, the re-route message may include this information. The security context may be included in the re-route. By way of example, the security context may be included in addition to the Attach Message and CN type.

There may be at least two ways to achieve including general security information in the re-route message. The MME may send one container that includes both the WTRU message and the security parameters. Security parameters may include, for example, authentication vectors and/or other security contexts, parameters, or algorithms. Alternatively, an IE may be included for each part. For example, one IE may be included for the WTRU message, one IE may be included for the authentication parameters, and one IE may be included for the security parameters, etc.

In an embodiment, the dedicated CN node may run the NAS security mode command (SMC) procedure. The first MME may run the identity request/response and authentication request/response procedures, and the dedicated CN node may run the SMC procedure. The operator may have the choice to run no, one, or more than one procedure before re-routing the message to a dedicated CN node. For example, the first MME may be configured to run no identification, authentication, or SMC procedures. The MME may then route the Attach Message. A lack of IEs related to, or defined specifically for, WTRU identity, authentication context, and other security context, such as algorithms for ciphering and/or integrity protection, may cause the dedicated CN node to run corresponding identification, authentication, and SMC procedures. Alternatively, the first MME may only run the identification request/response procedure and include information related to the WTRU's identity, such as the IMSI, in the re-route message. The lack of authentication and security parameters may inform the dedicated CN node to run procedures for these parameters. The first MME may either not include the related information or may include the corresponding IE but set the values to a well-known value, for example NULL or zero. A known value may indicate to the dedicated CN node that it should run these procedures with the WTRU.

Alternatively, the first MME may explicitly indicate which procedures it has run and which procedures need to be run by the dedicated MME. Alternatively, the first MME may indicate which procedures it has run, and the dedicated MME may implicitly know which other procedures may need to be run. To do so, the first MME may use a bitmap where each bit position corresponds to a procedure, and the setting of the bit, which may be either "1" or "0," may imply that the procedure has been run. Other explicit or implicit indications may be used, such as including an IE per procedure.

As disclosed above with respect to previously described embodiments, an MME may communicate with an HSS to receive subscription information. In one example, the HSS may push subscription information to the MME when a change in the subscription information occurs.

A WTRU's subscription information may change at a CN, for example, when the CN has updated the WTRU profile information that indicates that the WTRU should be served by a dedicated CN node. When the WTRU's subscription information changes, the MME or SGSN may page the WTRU. The MME or SGSN may use the IMSI as the WTRU's paging identity. Paging the WTRU by IMSI in the PS domain may force the WTRU to re-attach to the system. Hence, when paged with IMSI, the WTRU may re-attach to the system and the MME or SGSN may use any redirection solution for attach in order to redirect the WTRU to a dedicated CN node. Thus, the change of WTRU profile information at the CN may trigger the CN to page the WTRU.

The change of WTRU profile information may also trigger the CN to page the WTRU with other identities, such as a S-TMSI in LTE and P-TMSI in UMTS. When the WTRU enters connected mode, for the case wherein the CN node is an MME, the GUTI reallocation command may be used to reallocate a WTRU identity. For the case wherein the CN node is an SGSN, the P-TMSI reallocation command may be used to reallocate a WTRU identity. For the case wherein the CN node is an MSC/VLR, the TMSI reallocation command may be used to reallocate a WTRU identity.

As referenced above, the network may page the WTRU with S-TMSI. Upon completion of the Service Request procedure, the network may initiate a detach procedure, for instance by sending a Detach Request to the WTRU, and may indicate "re-attach required". This may cause the WTRU to re-attach to the system.

Figure 7:
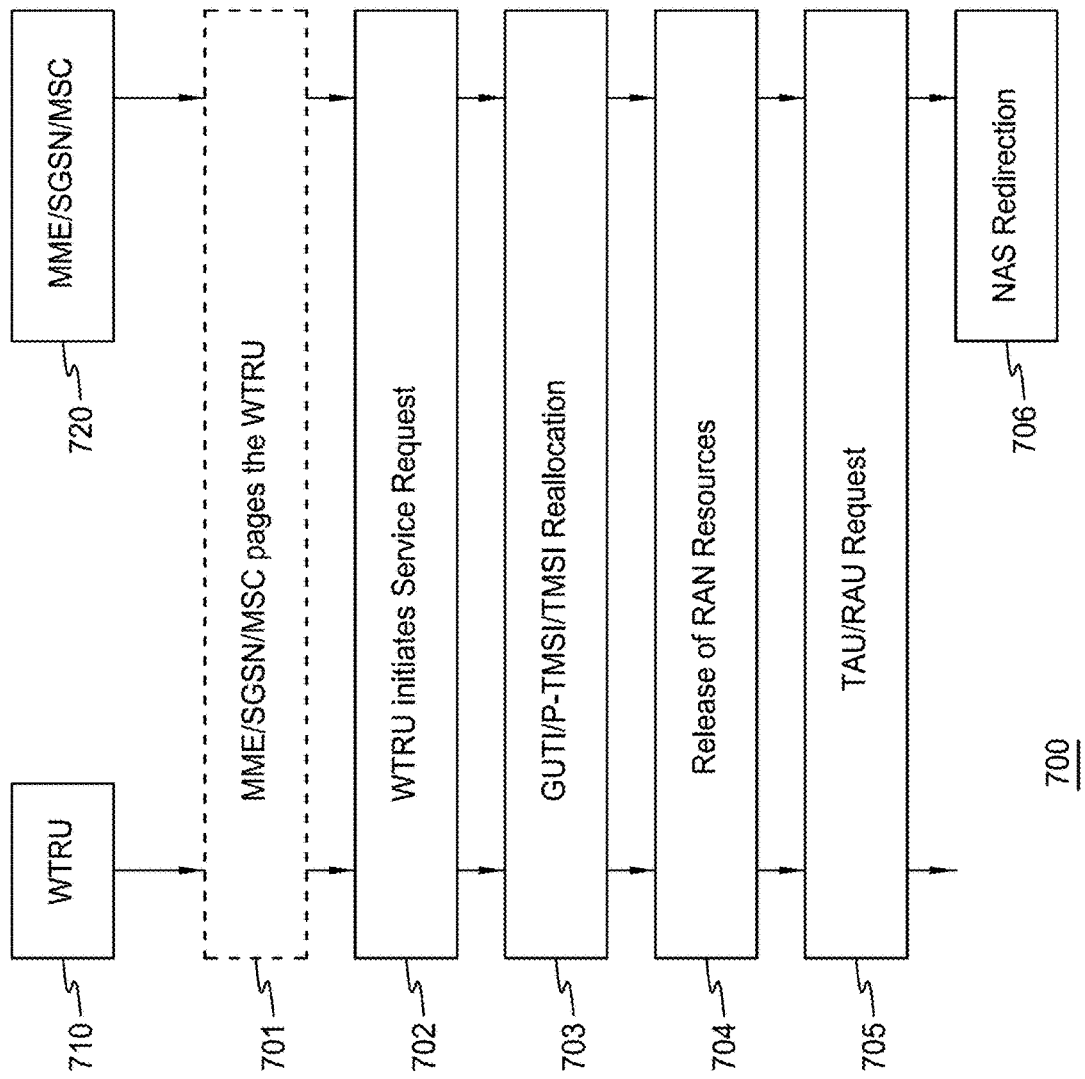
FIG. 7 is a signaling diagram of an example method of a WTRU being redirected to a dedicated CN node when a WTRU sends a Service Request.

FIG. 7 depicts a signaling diagram of a method of redirecting a WTRU to a dedicated CN node when a Service Request procedure is performed. At 701, the network, which may be an MME 720 for example, may page the WTRU 710 to bring the WTRU 710 into connected mode. The MME 720 may also be an SGSN or MSC. At 702, the WTRU 710 may perform a Service Request procedure. The WTRU 710 may initiate a NAS connection establishment by sending a Service Request to the network. The network may be, for example, an MME 720. At 703, the MME 720 may trigger a GUTI reallocation procedure and respond to the WTRU 710 with a non-broadcast TAI or routing area identity (RAI). The GUTI reallocation procedure may additionally or alternatively include the GUTI that points to a dedicated core network. At 704, the MME 720 may then release RAN resources associated with the WTRU 710. The WTRU 710 may then move to an idle mode. Thus, the next time the WTRU 710 enters connected mode, at 705, the WTRU 710 may include the GUTI or at least part of the GUTI, such as the S-TMSI, in the TAU Request and may be redirected to a dedicated MME. The WTRU 710 receiving the TAI or RAI may trigger the WTRU 710 to perform a TAU/RAU procedure and send a TAU/RAU request. Although not shown in FIG. 7, the WTRU may communicate through an eNB to the MME. The MME or the eNB may redirect the WTRU to the dedicated MME through a NAS redirection procedure.

Additionally or alternatively, the Service Request procedure may be responded to by sending a GUTI reallocation command upon which the WTRU 710 may consider the procedure to have completed and stop the timer that guards the Service Request procedure. Alternatively, the GUTI reallocation procedure may be initiated after the CN node triggered handover command.

The MME 720 may also run the GUTI reallocation procedure if the first message received from a WTRU 710 is the Detach Request message. This may also enable the system to redirect the WTRU 710 to a dedicated CN node the next time the WTRU 710 attaches to the system. Thus, for any NAS procedure that is not an attach or TAU procedure, if the MME is aware that the WTRU 710 is subject to redirection to a dedicated CN node, the MME 720 may run the GUTI reallocation procedure to allocate an identity that points to a specific CN node.

Although the example method depicted in FIG. 7 shows messages and/or steps in a particular order, it should be recognized that not all messages and/or steps may be necessary and the particular order may be different. Furthermore, whereas steps and/or messages may be depicted as separate events, the steps and/or messages may be combined as a single event. Likewise, a single event may be broken out into multiple events.

The examples described above may apply to LTE, GERAN and UMTS systems where the corresponding identity reallocation procedures may be used according to the system/domain. For example, if a WTRU has a NAS signaling connection with the MSC in a GERAN or UMTS system, the MSC may run a TMSI reallocation command procedure as described above. For SGSN, a P-TMSI reallocation command procedure may be run as described above.

In order to speed up the redirection procedure, the CN may release the WTRU's connection with a cause code to force the WTRU to re-establish a new NAS connection. A new cause code may be defined at the RRC layer to indicate that the WTRU should re-attach to the system. Alternatively, a new cause code may be defined for the WTRU to perform a TAU procedure.

The examples described above may apply to GERAN and UTRAN systems where similar procedures may be used, such as LAU for the CS domain and RAU for the PS domain. Furthermore, the eNB may be replaced by a BSC and an RNC for GERAN and UMTS systems, respectively.

Alternatively, an existing mechanism may be used to quickly redirect the WTRUs. The MME may use a load balancing procedure, which may cause the S1 and RRC connections to be released. The RRC may include a release code set to "load balancing TAU required," which may force the WTRU to perform a TAU. Thus, with the GUTI being re-allocated such that it can point to a specific MME, using the load balancing procedure may enable a quick redirection.

Thus, with any NAS procedure, such as a TAU or Service Request, a GUTI reallocation may be used to first provide the WTRU with an identity that points to a specific CN, and then the WTRU's connection may be released as described above in order to make the redirection faster.

Another alternative is that, for a given NAS procedure or connected mode (CM) Service Request (MSC), the CN node may first run the corresponding identity procedure. After its completion, the CN node may reject the NAS procedure with Service Reject or CM Service Reject, and the CN node may indicate that the WTRU is implicitly detached. For example, a cause code for the PS domain of UMTS and LTE may be used. Other causes that may lead the WTRU to re-establish a NAS signaling connection, such as to re-register, may also be used if applicable. Alternatively, a new cause code may be defined that may force the WTRU to re-register to the system. For example, the WTRU may perform an attach or an update procedure, such as a TAU, RAU, or LAU.

In an embodiment, the CN node may reallocate the identity after the Service Request procedure completes. For example, the MME may send a GUTI reallocation command message, the SGSN may send a P-TMSI reallocation command message, or the MSC/VLR may send the TMSI reallocation command message.

In an example embodiment wherein the CN node is an MME, the MME may receive a Service Request message or an Extended Service Request message and the profile information of the WTRU, as provided by the HSS. The profile information may indicate that the WTRU should be served by a dedicated CN node. The MME may initiate a GUTI reallocation command procedure/message before or after the completion of the Service Request procedure. If the GUTI reallocation command is run before the completion of the Service Request procedure, the MME may optionally send a Service Reject with a cause code that may force the WTRU to re-attach to the system.

In an example embodiment wherein the CN node is an SGSN, the SGSN may receive a Service Request message and the profile information of the WTRU, as provided by the HSS/HLR. The profile information may indicate that the WTRU should be served by a dedicated CN node. The SGSN may initiate a P-TMSI reallocation command procedure/message before or after the completion of the Service Request procedure.

In an example embodiment wherein the CN node is an MSC/VLR, the MSC/VLR may receive a CM Service Request message and the profile information of the WTRU, as provided by the HSS/HLR. The profile information may indicate that the WTRU should be served by a dedicated CN node. The MSC/VLR may initiate the TMSI reallocation command procedure/message before or after the completion of the Service Request procedure.

Redirection with GUTI re-allocation may be used for any initial NAS message that a WTRU sends, for example a paging response in GERAN, and may not limited to the Service Request or CM Service Request messages. For any NAS procedure or message that the WTRU sends, the CN may decide to reallocate the identity, for example via a GUTI reallocation command, before or after the procedure completes. The CN may decide, for example, based on a change of subscription information such that it indicates the use of dedicated CN node for the WTRU.

Furthermore, the CN node, which may be for example an MME, SGSN, or MSC/VLR, may run the identity reallocation procedure at any time when the WTRU is in connected mode. Identity reallocation procedures may include, for example, a GUTI reallocation command for a MME, a P-TMSI reallocation command for an SGSN, or a TMSI reallocation command for an MSC/VLR. In an example embodiment, a WTRU may be involved in an ongoing data transfer and if the subscription or profile information of the WTRU is updated such that the WTRU should be served by a dedicated CN node, the appropriate WTRU identity reallocation procedure may be executed.

Additional embodiments are disclosed herein addressing how to handle race conditions during redirection with a CN triggered handover. In an embodiment, a CN-triggered handover may force the eNB to select a new MME without affecting the WTRU. The CN may trigger the handover at any time after the attach procedure is completed. If handover is triggered by the CN, it may be possible for the WTRU or the eNB to start a different procedure. For example, the WTRU may begin a session management procedure to initiate the activation of a PDN connection or a new dedicated bearer. Additionally or alternatively, the MME may start the MME-initiated handover. In another example embodiment, the eNB may be in the process of handing over the WTRU to another eNB either using S1 or X2 handover, and, at the same time, the MME may initiate the handover toward the eNB for redirecting the WTRU.

Although the CN-initiated handover scenario may be used to exemplify the methods to handle race conditions, these methods may be applied to similar race conditions in other solutions.

In another embodiment, a race condition may be handled for a CN-initiated handover during an ongoing RAN handover. Upon reception of a CN-initiated handover request to redirect the WTRU, if the RAN node, for example an eNB, RNC, or BSC, is executing a handover, the RAN node may reject the request and indicate that the reason is ongoing handover. Upon reception of a rejected request for CN-initiated handover, which may be received from a RAN node, the CN node may wait until the handover is complete before initiating a new request. The CN may determine that the handover is complete when the CN receives confirmation of the handover completion from the target RAN node. For example, in LTE, the CN may determine a handover is complete when it receives a path switch request message from the target eNB.

In yet another embodiment, the handling of other procedures during an ongoing CN-initiated handover is addressed. During a CN-initiated handover, the CN may receive a request from either the WTRU or the SGW/PGW to activate, deactivate, or modify a bearer. The handling of this request may depend on whether the handover succeeds or fails.

The MME may take the following actions when it receives a request to activate, deactivate, or modify a bearer from the SGW/PGW and the MME has initiated a handover to redirect the WTRU. The MME may reject the request and include a cause code to indicate that there is a handover in progress. For example, if the MME receives a Create Bearer Request from the SGW, the MME may respond with a Create Bearer Response and include a cause value to indicate that the handover is in progress. The MME may include a timer after which the destination node, such as an SGW or PGW, may retry. Upon reception of a response indicating that handover is in progress, the SGW or PGW may retry the request after a certain pre-configured time or after the indicated time elapses. Upon reception of this response, the SGW may either retry after a time elapses as described above, or it may in turn send a Create Bearer Response to the PGW and include the same cause code and timer value, if present. The PGW may later retry the request. Alternatively, an existing cause code may be used. For example, WTRU may refuse or is unable to page the WTRU.

The MME may take the following actions when it receives a request to active, deactivate, or modify a bearer from a WTRU and the MME has initiated a handover to redirect the WTRU. The MME may ignore the request, which may eventually cause a timer to expire at the WTRU. The WTRU may request again later. The MME may reject the request and include an existing or new cause code that may either inform the WTRU that a handover is pending or that the WTRU should retry. The MME may reject the request and include an NAS session management back-off timer with a value set to zero or any other non-zero but short value. The MME may initiate a routing procedure of this request if the MME receives a confirmation that the handover has been successful. The MME may forward the request to a new MME when the new MME requests the WTRU's context. A new IE or procedure may be defined. The new IE may be included in the context response that the source MME sends to the target dedicated MME. This new IE may hold the WTRU's NAS message. Upon reception by the target MME, the target MME may process the request and respond to it accordingly.

Alternatively, if the eNB determines that there is an ongoing handover to redirect the WTRU, the eNB may not forward the request to the source MME. The eNB may later forward the NAS message to the target MME after the handover is complete. Alternatively, the eNB may not acknowledge the receipt of the message over RRC, PDCP, RLC, MAC, etc., which may then force the WTRU to re-send the NAS message. By then, if the handover is complete, the eNB may forward it to the new MME.

In an embodiment, a CN node, such as an, MME, SGSN, or MSC, may perform a re-allocation of the WTRU identity after the handover is complete to provide the WTRU with a new ID that points to the actual serving CN node. This serving CN node may be the CN node that has the WTRU context after the handover. After the CN-triggered handover, the target dedicated MME may now have the WTRU context and may initiate a GUTI re-allocation command toward the WTRU and assign a new GUTI. Similarly, a target or new SGSN may run a P-TMSI reallocation procedure after the handover is complete in order to provide the WTRU with a new identity that may point to the serving SGSN. Similarly, a target or new MSC/VLR may run a TMSI reallocation procedure after the handover is complete in order to provide the WTRU with a new identity that points to the serving MSC/VLR.

During the identity re-allocation procedure described above, the CN may include a non-broadcast identity in the procedure. Example identity reallocation procedures include a GUTI reallocation command for LTE, a P-TMSI reallocation command for the PS domain of a GPRS/UMTS system, or a TMSI reallocation command for the CS domain of GPRS/UMTS system. In an LTE example, during the GUTI reallocation command described above, the MME may also include a non-broadcast TAI in the message, such as a GUTI reallocation command, that is sent to the WTRU. This may help speed up a registration from the WTRU. When the WTRU reads the system information, it may realize that the allowed TAI list as provided by the MME in the GUTI reallocation command is not equivalent to what is actually being broadcast by the RAN. Hence the WTRU may immediately send a registration message, such as a TAU, to the MME.

A similar example may apply to an SGSN and an MSC/VLR with corresponding messages. For example, during a P-TMSI reallocation command, an SGSN may also include a non-broadcast RAI for the WTRU. Similarly, when the WTRU realizes that a broadcast RAI is not equivalent to the non-broadcast RAI as provided in the P-TMSI reallocation command, the WTRU may then send an RAU to the SGSN. Similarly, during a TMSI reallocation command, the MSC/VLR may also include a non-broadcast location area identity (LAI) for the WTRU. When the WTRU realizes that a broadcast LAI is not equivalent to the non-broadcast LAI as provided in the TMSI reallocation command, the WTRU may then send an LAU to the MSC/VLR.

Additional example embodiments provide solutions for switching from a dedicated CN to a non-dedicated CN. When a WTRU is already attached/registered to a dedicated CN node, the WTRU may find it needs to switch back to the non-dedicated CN node. The following events may trigger a switch back to a non-dedicated CN node. The WTRU may receive an indication from the dedicated CN node that it is overloaded. In such a scenario, the WTRU may receive an Attach Reject, a TAU Reject, or a Service Reject with a mobility management back-off timer from the dedicated CN node. Upper layer data transmission errors may indicate that the dedicated CN node, such as a dedicated SGW or PGW, is malfunctioning. A WTRU may be scheduled to remain attached to the dedicated CN node for some portion of a day and then attach to the non-dedicated CN node for the rest of the day. The Access Point Name (APN) that the WTRU requested to access may not be supported by the dedicated CN node.

Figure 8:
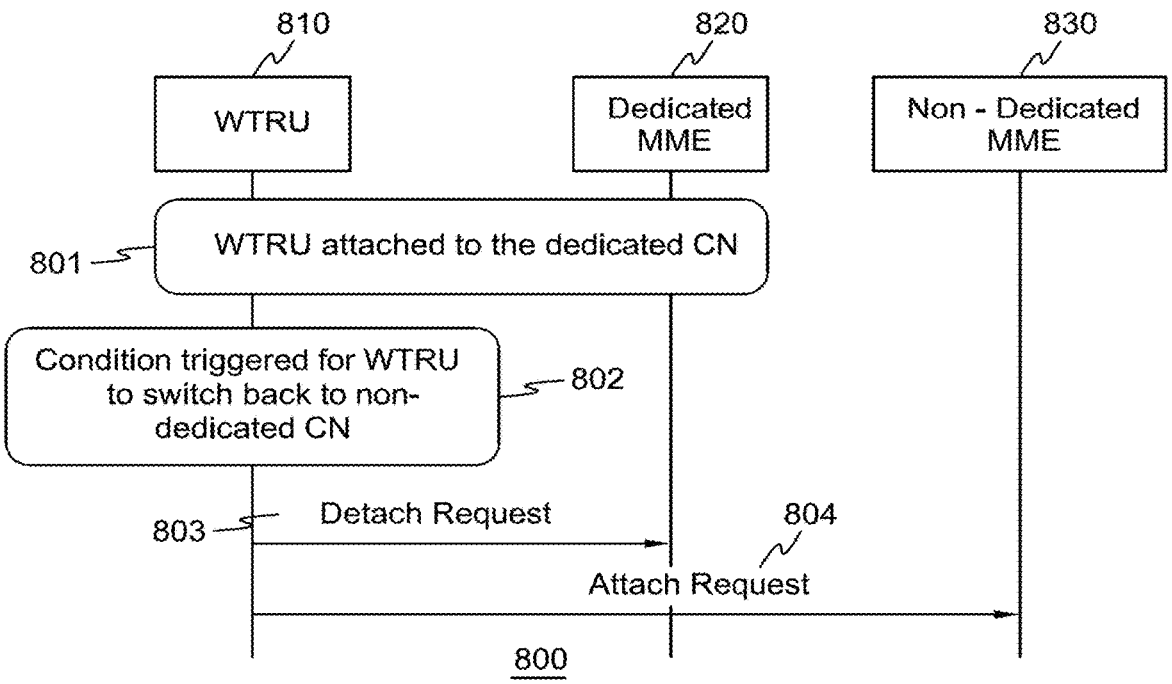
FIG. 8 is a diagram of an example method for a WTRU to switch from a dedicated CN node to a non-dedicated CN node.

FIG. 8 is a diagram of an example method of a WTRU switching from a dedicated CN node to a non-dedicated CN node. In the example illustrated in FIG. 8, at 801 a WTRU 810 may be attached to a dedicated CN. At 802, a condition being satisfied may trigger the WTRU 810 to switch from the dedicated network to the non-dedicated one. At 803, the WTRU 810 may detach from the dedicated CN node by sending a Detach Request and then initiate a new Attach Request at 804. A new detach type may be defined. A new indication may be included in the new Attach Request to inform the non-dedicated MME 830 that it should ignore the subscription data that indicates that the WTRU 810 should be redirected to a dedicated CN node. The Attach Request may further include an indication of a length of time during which the non-dedicated MME 830 should ignore the subscription data. Upon receiving this indication, the non-dedicated MME 830 may treat the Attach Request as a normal WTRU Attach Request and will not redirect the Attach Request, and hence the WTRU 810, to the dedicated CN node.

In order for an eNB to route the new Attach Request to the non-dedicated MME 830, the WTRU 810 may omit the S-TMSI, which has the MME code of the dedicated MME 820, from the RRC Connection Request message. The methods described above for including some indication in the RRC message to force the eNB to choose the dedicated CN node may also be used similarly to force the eNB to choose the normal MME for this new Attach Request.

Additionally or alternatively, the WTRU 810 may indicate to the non-dedicated MME 830 how long the WTRU 810 should be attached to the non-dedicated CN. After that period of time, the non-dedicated MME 810 may redirect the WTRU 810 to the dedicated MME 820 again. Alternatively, the length of time that the WTRU 810 may be attached to the non-dedicated MME 830 may be pre-configured in the MME or may be included in the WTRU's subscription data.

Although the example method depicted in FIG. 8 shows messages and/or steps in a particular order, it should be recognized that not all messages and/or steps may be necessary and the particular order may be different. Furthermore, whereas steps and/or messages may be depicted as separate events, the steps and/or messages may be combined as a single event. Likewise, a single event may be broken out into multiple events.

Figure 9:
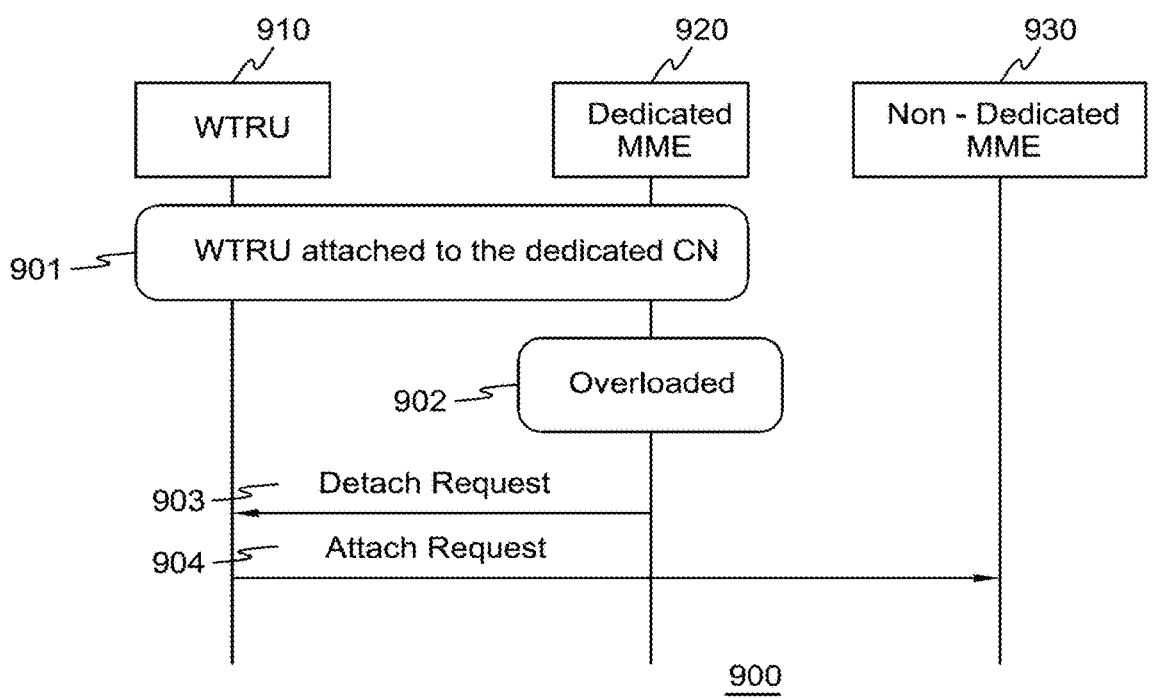
FIG. 9 is a diagram of an example method for a dedicated CN node to initiate a WTRU to switch back to the non-dedicated CN node.

FIG. 9 is a diagram of an example method of a dedicated CN node initiating a procedure to switch back a WTRU to the non-dedicated CN node. At 901, a WTRU 910 may be attached to the dedicated MME 920. The dedicated MME 920 may decide to detach the WTRU 910 for any number of reasons. By way of example, at 902, the dedicated MME 920 may become overloaded and decide that the WTRU 910 should be detached. At 903, the dedicated MME 920 may explicitly send a Detach Request to the WTRU 910 with some indication that the WTRU 910 should re-attach to the non-dedicated MME 930. For example, a new detach type may be defined to serve as this indication. After the Detach Request, at 904, the WTRU 910 may send an Attach Request to the non-dedicated MME 930. As described above, the Attach Request may include a new indication to inform the non-dedicated MME 930 that it should ignore the subscription data that indicates that the WTRU 910 should be redirected to a dedicated CN node and may further include an indication of a length of time during which the non-dedicated MME 930 should ignore the subscription data. Alternatively, although not depicted in FIG. 9, after receiving a Detach Request from the dedicated MME 920, the WTRU 910 may explicitly send a Detach Request to detach from the dedicated MME 920 and then re-attach to the non-dedicated MME 930.

Although not depicted in FIG. 9, the dedicated CN node may include an indication in a TAU Reject or Service Reject message to request the WTRU 910 to re-attach to the non-dedicated CN node.

Although the example method depicted in FIG. 9 shows messages and/or steps in a particular order, it should be recognized that not all messages and/or steps may be necessary and the particular order may be different. Furthermore, whereas steps and/or messages may be depicted as separate events, the steps and/or messages may be combined as a single event. Likewise, a single event may be broken out into multiple events.

As described above, a target MME may receive a NAS message, such as a Service Request, from a WTRU for which the MME does not contain a context. In order to avoid this, the eNB may include the GUMMEI and S-TMSI in an initial WTRU message procedure that is sent on the S1AP interface. Therefore, when the eNB receives a GUMMEI from the WTRU as part of the RRC connection procedure, such as in the RRCConnectionSetupComplete message, the eNB may verify if the GUMMEI contains a null-MMEGI.

If the GUMMEI contains a null-MMEGI, the eNB may include the GUMMEI in the initial WTRU message sent to the target MME. In this case, the initial WTRU message is sent to the dedicated MME since the eNB sends the NAS message to the dedicated MME based on the GUMMEI. The dedicated MME may receive the initial NAS message for a WTRU in question via the eNB.

The target MME may know if it is configured to operate as a dedicated MME. The target MME may verify if the MMEGI in the GUMMEI has a value of a null-MMEGI. If a null-MMEGI is included in the GUMMEI, the target MME may process the NAS message and not reject it even if the MME does not contain a context for this WTRU.

The target MME may fetch the WTRU context from the source MME using the information received from the eNB, such as by using the GUMMEI and S-TMSI. For example, if the initial NAS message is an Extended Service Request or Service Request (collectively referred to as Service Request), the target MME, even if it does not contain a context for the WTRU, may fetch the WTRU context from the source MME based on the check described above.

While the target MME fetches the context, the source MME may provide the target MME with any subscription information that indicates if the WTRU should be served by a dedicated CN. The source MME may provide the target MME with an indication of whether the WTRU should be served by a dedicated MME only, a dedicated MME and SGW, or a dedicated MME, SGW and PGW. For example, if the subscription information or context information indicates that the PGW should be re-allocated to be a dedicated PGW, the target MME may then determine to trigger the WTRU to re-attach.

Alternatively, after the target MME gets the WTRU context, the target MME may verify using domain name system (DNS) or other methods if it needs to re-allocate the WTRU's PGW and force the WTRU to re-attach.

After the context is fetched, the target MME may respond to the WTRU using any of the methods described herein.

An MME may, even if it has fetched the WTRU context, respond with a Service Reject, but include a cause code that triggers the WTRU to re-attach to the system, optionally using a cause code that does not lead the WTRU to delete the GUTI.

For example, an MME may send a Service Reject and include a cause code "#10—Implicitly detached". Alternatively, the MME may use cause code "#40—No EPS bearer context activated". The Service Reject may be used with the cause codes as described above if the MME needs to re-allocate a dedicated PGW. If the NAS message is a TAU Request, the MME may still reject the TAU and include a cause code that forces the WTRU to re-attach to the system, optionally with a cause code that does not cause the GUTI to be deleted at the WTRU, for example cause code #10 or #40.

In another embodiment of a method for forcing the WTRU to re-attach to the system, an MME may initiate a bearer context deactivation and identify the bearer to be the default bearer. For any reason or at any time that the MME wants the WTRU to re-attach to the system, such as for the purpose of using dedicated CN nodes, the MME may send the Deactivate EPS Bearer Context Request and include a cause code that may trigger the WTRU to eventually re-attach to the system. The re-attachment may occur after the performance of an explicit detach.

For example, the MME may use cause code "#39—reactivation requested". This may trigger a WTRU redirection to a dedicated CN regardless of the actual redirection solution. Redirection solutions may include a re-route of attach solution, or null-MMEGI solutions, etc. The MME may deactivate a default bearer and the overall PDN connection of the WTRU at any time, with or without GUTI reallocation.

Alternatively or additionally, an MME may initiate the detach procedure if the MME requires that the WTRU re-attach to the system for the purpose of redirecting the WTRU to a dedicated CN node. At any time, the MME may decide to redirect the WTRU and may require that the WTRU re-attach, for example in order to reselect another dedicated PGW. The MME may send the Detach Request message to the WTRU and include the detach type IE with a value set to "re-attach required". This method may be deployed in conjunction with other methods described herein. For example, the MME may first perform GUTI reallocation, then initiate the detach procedure by sending a Detach Request and indicating "re-attach required" as the detach type.

If the MME can continue serving the WTRU without PGW re-allocation, the MME may use the fetched WTRU context and accept the WTRU's request. However, if the MME needs to re-allocate the SGW, the MME may in addition trigger an SGW re-allocation to pick an SGW that is a dedicated SGW. The MME may perform an SGW re-allocation as part of the Service Request procedure or alternatively after the Service Request procedure is complete.

As described above, a source MME, which may be a non-dedicated MME, or a target MME, which may be a dedicated MME, may trigger a WTRU re-attach. Methods for triggering WTRU re-attach by a non-dedicated and dedicated MME will now be described.

For WTRUs that are already registered in the system, the reselection of a PGW may require re-attaching the WTRU if a dedicated PGW is desired.

Configurations in the source MME may indicate if the re-attach should be triggered by the source MME before redirection. When the source MME receives updated subscription information to redirect the WTRU, or due to any local policy that requires the redirection of a WTRU to a dedicated CN, the source MME may first verify if the PGW needs to be re-selected. This may be done using DNS or other local policies or other functionalities. If the PGW also needs to be redirected, the MME may verify its local policies to see if it should re-attach the WTRU or redirect the WTRU and leave it up to the target MME to perform the re-attach.

If MME policies or configurations indicate that the MME should perform WTRU re-attach, the MME may employ any of the methods described above to redirect the WTRU. For example, the MME may initiate a WTRU Detach Request procedure and include the type set to "re-attach required," or the MME may deactivate the PDN connections of the WTRU. While deactivating the last PDN connection or the last default bearer, the network may indicate "#39—reactivation requested" in the NAS session management message as explained above.

After re-attaching the WTRU as described above, the source MME may redirect the WTRU to a dedicated target MME. The source MME may forward information to the target MME, for example, when the target MME attempts to fetch the WTRU context from the source MME. The information may indicate that a redirection of MME and/or SGW only is needed in order to avoid reselection of a PGW which may trigger another re-attach at the target MME.

The source MME may have configurations to let the target MME re-attach the WTRU if necessary. As such, when the subscription changes such that the WTRU should be redirected to a dedicated MME, the source MME may perform the redirection and defer to the target MME to evaluate if a re-attach is still needed for the WTRU. After redirecting the WTRU, the target MME may fetch the WTRU context from the source MME. The source MME may include the relevant subscription information in the WTRU context to inform the target MME if the PGW should also be redirected. Alternatively, upon reception of the subscription information from the source MME or from the HSS, the target MME may further determine if the PGW needs to be re-allocated. The target MME may make the determination, for example, using DNS or other methods.

If the PGW needs to be re-allocated, the target MME may initiate a WTRU re-attach using any of the methods described above. For example, the target MME may reject the WTRU's NAS message and indicate that a re-attach is required.

It is important to note that all of the methods and procedures described above also apply to other RATs such as GERAN and UTRAN systems with the corresponding procedures at the NAS or RAN-to-Core Network interfaces/protocols. Thus, even though the methods are described in the context of LTE, they apply to other systems accordingly.

Figure 10A:
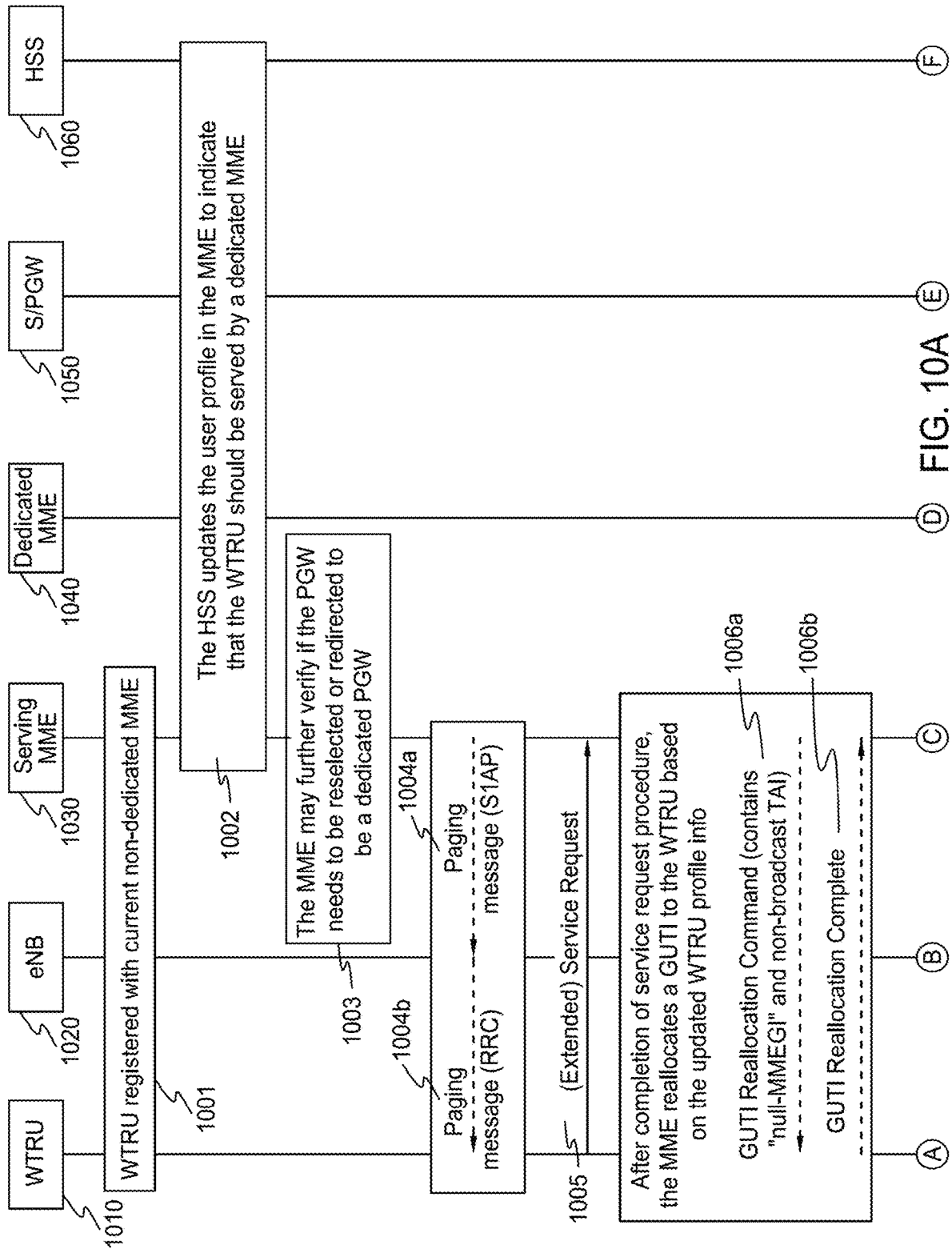
FIGS. 10A and 10B are a diagram of an example method for performing WTRU redirection.
Figure 10B:
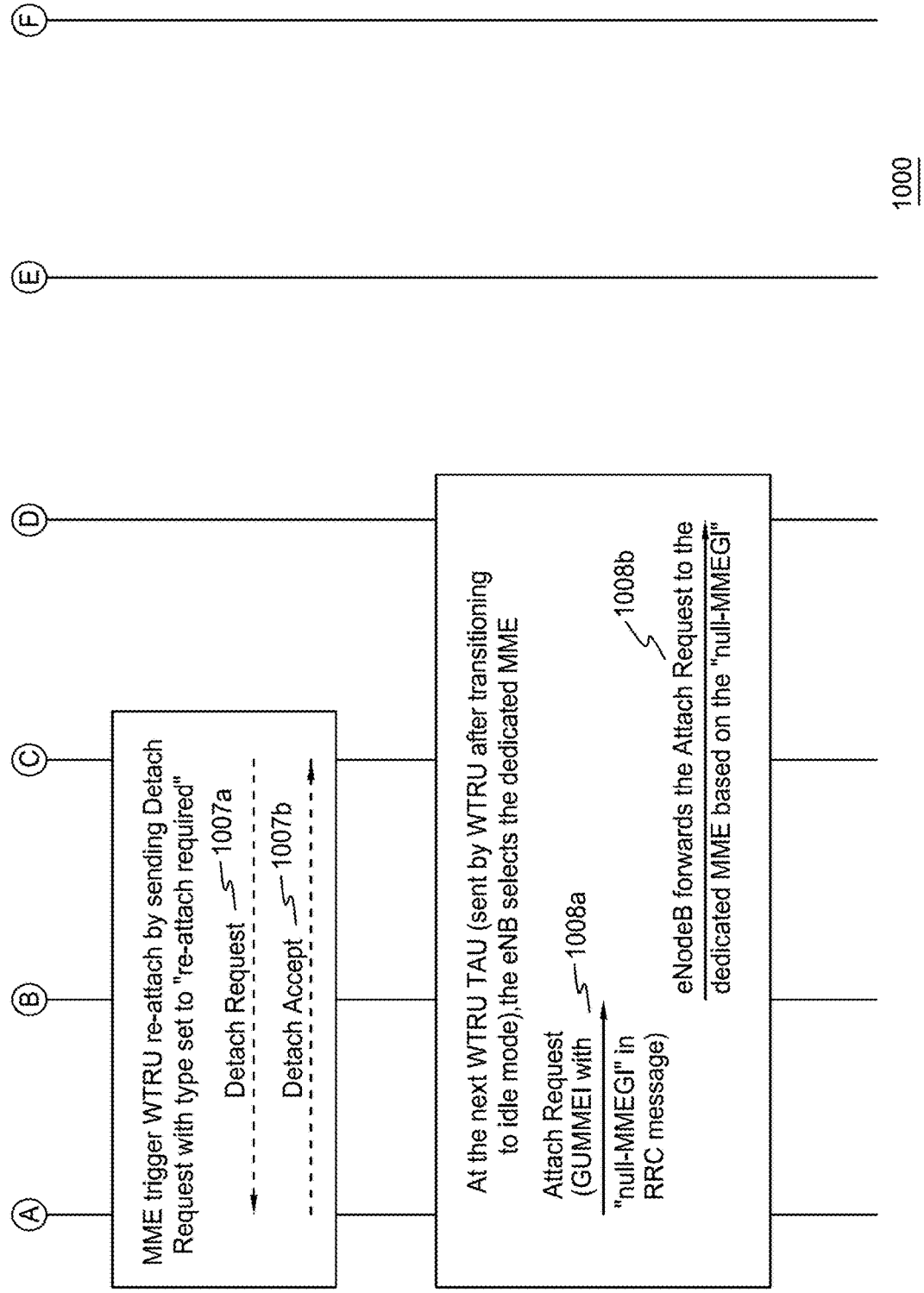

FIGS. 10A and 10B are a signal flow diagram of an example method for performing WTRU redirection. With respect to FIG. 10A, at 1001, a WTRU 1010 is registered with a serving non-dedicated MME 1030. At 1002, the HSS 1060 may update the user profile 1002 in the MME 1030 to indicate that the WTRU 1010 should be served by a dedicated MME 1040. The HSS 1060 may do so by pushing subscription information to the MME 1030. At 1003, the serving MME 1030 may verify if the PGW needs to be reselected or redirected to be a dedicated PGW. At 1004*a* and 1000*b*, the MME 1030 may optionally proactively redirect the WTRU 1010 by paging the WTRU 1010 if the WTRU 1010 is in idle mode. At 1004*a*, an S1AP paging message may be sent by the Serving MME 1030 to the eNB 1020 and at 1004*b* an RRC paging message may be sent by the eNB 1020 to the WTRU 1010. Alternatively, at 1005 the MME 1030 may wait until the WTRU 1010 performs a Service Request or Extended Service Request. If the MME 1030 waits until the WTRU 1010 performs a Service Request, paging may not occur.

If the WTRU is already in connected mode, step 1006 as illustrated in FIG. 10A may occur directly after 1003. At 1006, the Serving MME 1030 may reallocate a GUTI to the WTRU 1010 based on the updated subscription information. This may be accomplished at 1006*a* by the MME 1030 sending a GUTI Reallocation Command containing null-MMEGI and a non-broadcast TAI to the WTRU 1010. At 1006*b*, the WTRU 1010 may respond to the MME 1030 with a GUTI Reallocation Complete message. Again, as noted above, similar procedures may be used in GERAN and UTRAN between the WTRU and the SGSN using the corresponding NAS messages. For example, a P-TMSI Reallocation Command may be used instead of the GUTI Realloation Command.

With respect to FIG. 10B, at 1007, the MME 1030 may trigger the WTRU 1010 to reattach by sending a Detach Request with a type set to "reattach required" at 1007*a*. At 1007*b*, the WTRU 1010 may then respond with a Detach Accept 1007*b*. At 1008, at the next WTRU TAU, which may be sent by the WTRU 1010 after transitioning to idle mode, the eNB 1020 may select a dedicated MME 1040. This may be accomplished at 1008*a* by the WTRU 1010 sending an Attach Request including a GUMMEI indicating null-MMEGI in an RRC message and at 1008*b* the eNB 1020 forwarding the Attach Request to the dedicated MME 1040 based on the null-MMEGI.

Although the example method depicted in FIG. 10 shows messages and/or steps in a particular order, it should be recognized that not all messages and/or steps may be necessary and the particular order may be different. Furthermore, whereas steps and/or messages may be depicted as separate events, the steps and/or messages may be combined as a single event. Likewise, a single event may be broken out into multiple events.

Figure 11:
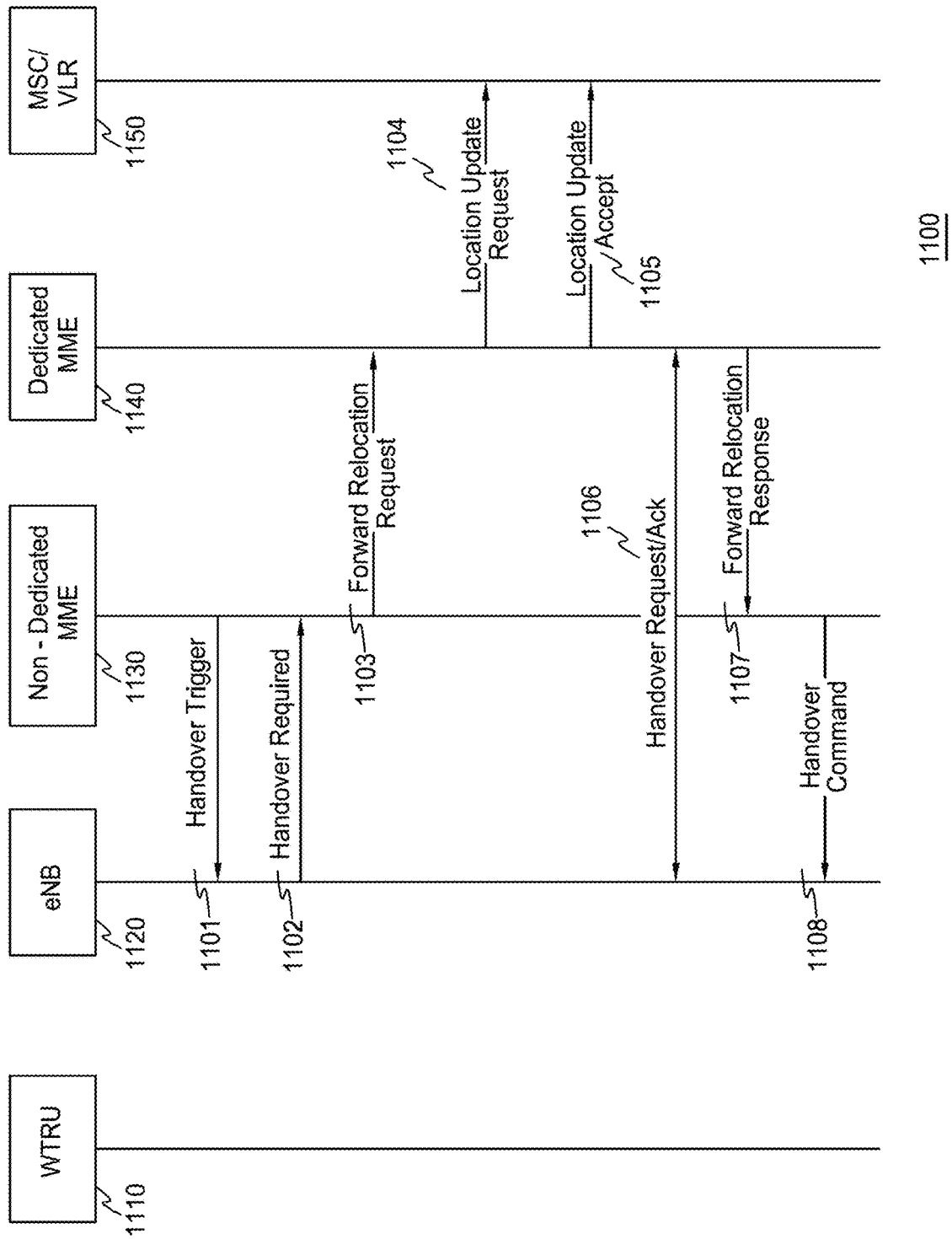
FIG. 11 is a diagram of an example location update procedure initiated by the MME.

FIG. 11 is a diagram of an example location update procedure initiated by a non-dedicated MME 1130. At 1101, the non-dedicated MME 1130 may send a Handover Trigger message to the eNB 1120. At 1102, the eNB 1120 may respond with a Handover Required message. At 1103, the non-dedicated MME 1130 may send a Forward Reallocation Request message to the dedicated MME 1140. The Forward Reallocation Request message may include the registered LAI, VLR number, and/or a CSFB flag to indicate that the WTRU 1110 was registered with a MSC/VLR 1150 and there are active SGW associations between the non-dedicated MME 1130 and the MSC/VLR 1150. Upon receiving the Forward Reallocation Request and the aforementioned flag or registered LAI or VLR number in the message, if the dedicated MME 1140 supports CSFB function, the dedicated MME 1140 may initiate a Location Update procedure toward the registered MSC/VLR 1150 on behalf of the WTRU. At 1104, the dedicated MME 1140 may send a Location Update Request to the MSC/VLR and at 1105 receive a Location Update Accept in response. At 1006, the eNB 1120 and dedicated MME 1140 may then exchange Handover Request Acknowledge messages. At 1107, the dedicated MME 1140 may then send a Forward Relocation Response to the non-dedicated MME 1130. At 1108, the non-dedicated MME 1130 may then send a Handover Command to the eNB 1120.

Although the example method depicted in FIG. 11 shows messages and/or steps in a particular order, it should be recognized that not all messages and/or steps may be necessary and the particular order may be different. Furthermore, whereas steps and/or messages may be depicted as separate events, the steps and/or messages may be combined as a single event. Likewise, a single event may be broken out into multiple events.

Alternatively, the dedicated MME may send a Detach Request to the WTRU with type set to "IMSI detach" in order to trigger the WTRU to perform a re-attach for non-EPS services. The dedicated MME may send the Detach Request based on the information received from the non-dedicated MME about the WTRU's combined registration. Such information may include the CSFB flag, registered LAI, VLR number/address, TMSI, etc. Thus, when a TAU is then performed with type set to "IMSI attach" or when the WTRU wants to register for CS services, the MME may send a Location Update Request on the SGW's interface.

FIG. 12 is a diagram of an example IMSI detach procedure when the dedicated MME 1240 does not support CSFB functionality. At 1201, the non-dedicated MME 1230 may send a Handover Trigger message to the eNB 1220. At 1202, the eNB 1220 may respond with a Handover Required message. At 1203, the non-dedicated MME 1230 may send a Forward Reallocation Request message to the dedicated MME 1240. The Forward Reallocation Request message may include the registered LAI, VLR number, and/or a CSFB flag to indicate that the WTRU 1210 was registered with a MSC/VLR 1250 and there are active SGW associations between the non-dedicated MME 1230 and the MSC/VLR 1250. At 1204, the eNB 1220 and dedicated MME 1240 may then exchange Handover Request Acknowledge messages. At 1205, if the dedicated MME 1240 doesn't support CSFB function, it may return an indication in the Forward Relocation Response message that the CSFB is not supported. Upon receiving such an indication, at 1205 the non-dedicated MME 1230 may send a Handover Command to the eNB 1220. At 1206, the non-dedicated MME 1230 may initiate IMSI detach procedure toward the registered MSC/VLR 1250.

Although the example method depicted in FIG. 12 shows messages and/or steps in a particular order, it should be recognized that not all messages and/or steps may be necessary and the particular order may be different. Furthermore, whereas steps and/or messages may be depicted as separate events, the steps and/or messages may be combined as a single event. Likewise, a single event may be broken out into multiple events.

The methods and procedures discussed above apply to combined procedures in GERAN and UTRAN, as well using the corresponding interfaces and protocol messages. The methods and procedures described above may also apply with any existing redirection methods and procedures. For example, using any of the existing redirection methods, a target MME may fetch the WTRU context from the source MME which should then provide the indications described above. The target MME may take the actions described above based on these indications.

The embodiments described above may also be used to move a WTRU from a dedicated CN node to a non-dedicated CN node if the WTRU's subscription information changes or if the local policies at the serving CN require such behavior.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A method performed by a base station, the method comprising:
   receiving, by the base station, a first indication from a wireless transmit receive unit (WTRU) to direct a non-access stratum (NAS) message to a core network node associated with a specific service;
   transmitting, by the base station and to the WTRU, a message including a second indication to associate with a different core network node; and
   transmitting, by the base station and to the WTRU, data for the specific service from the different core network node.

2. The method of claim 1, wherein the first indication includes an identity associated with the core network node.

3. The method of claim 1, further comprising transmitting information indicating that the WTRU is subject to a configuration that uses the core network node.

4. The method of claim 1, wherein the first indication is received during radio resource control (RRC) connection establishment.

5. The method of claim 1, further comprising:
   selecting the different core network node based on the first indication.

6. The method of claim 1, wherein the WTRU is connected to the different core network node.

7. The method of claim 1, wherein the transmitting the message including a second indication to associate with the different core network node is based on a change in subscription information.

8. The method of claim 1, wherein the transmitting the message including a second indication to associate with the different core network node is based on a load of the core network node.

9. The method of claim 1, further comprising transmitting an indication to the WTRU to perform mobility registration.

10. The method of claim 9, further comprising releasing a connection to the WTRU to allow the WTRU to enter an idle mode to enable redirection to the different core network node.

11. A base station comprising:
    a receiver configured to:
       receive a first indication from a wireless transmit receive unit (WTRU) to direct a non-access stratum (NAS) message to a core network node associated with a specific service; and
    a transmitter configured to:
       transmit, to the WTRU, a message including a second indication to associate with a different core network node; and
       transmit, to the WTRU, data for the specific service from the different core network node.

12. The base station of claim 11, wherein the first indication includes an identity associated with the core network node.

13. The base station of claim 11, wherein the transmitter is further configured to transmit information indicating that the WTRU is subject to a configuration that uses the core network node.

14. The base station of claim 11, wherein the first indication is received during radio resource control (RRC) connection establishment.

15. The base station of claim 11, further comprising a processor configured to select the different core network node based on the first indication.

16. The base station of claim 11, wherein the WTRU is connected to the different core network node to receive the data.

17. The base station of claim 11, wherein the message including a second indication to associate with the different core network node is based on a change in subscription information.

18. The base station of claim 11, wherein the message including a second indication to associate with the different core network node is based on a load of the core network node.

19. The base station of claim 11, wherein the transmitter is further configured to transmit an indication to the WTRU to perform mobility registration.

20. The base station of claim 19, wherein a connection to the WTRU is released to allow the WTRU to enter an idle mode to enable redirection to the different core network node.

\* \* \* \* \*